United States Patent
Landa et al.

(10) Patent No.: US 10,870,742 B2
(45) Date of Patent: Dec. 22, 2020

(54) TRANSFER MEMBER FOR PRINTING SYSTEMS

(71) Applicant: LANDA LABS (2012) LTD., Rehovot (IL)

(72) Inventors: Benzion Landa, Nes Ziona (IL); Sagi Abramovich, Ra'anana (IL); Amit Haviv, Petach Tikva (IL)

(73) Assignee: LANDA LABS (2012) LTD., Rehovot (IL)

( * ) Notice: Subject to any disclaimer, the term of this patent is extended or adjusted under 35 U.S.C. 154(b) by 0 days.

(21) Appl. No.: 16/795,221

(22) Filed: Feb. 19, 2020

(65) Prior Publication Data

US 2020/0183305 A1    Jun. 11, 2020

Related U.S. Application Data

(63) Continuation of application No. 16/424,712, filed on May 29, 2019, now Pat. No. 10,606,191, which is a (Continued)

(30) Foreign Application Priority Data

Nov. 30, 2016    (WO) ............... PCT/IB2016/057226

(51) Int. Cl.
*B41M 5/025* (2006.01)
*C08K 3/36* (2006.01)
(Continued)

(52) U.S. Cl.
CPC .............. *C08K 3/36* (2013.01); *B41J 2/0057* (2013.01); *B41M 5/025* (2013.01);
(Continued)

(58) Field of Classification Search
CPC ........ C08K 3/36; C08K 5/5419; C08K 5/544; C08K 2201/005; C08K 3/04; C09C 3/10;
(Continued)

(56) References Cited

U.S. PATENT DOCUMENTS

| 5,085,803 A | 2/1992 | Wakita et al. |
| 9,180,658 B2 | 11/2015 | Kanasugi et al. |

(Continued)

FOREIGN PATENT DOCUMENTS

| EP | 0400544 A2 | 12/1990 |
| GB | 2474474 A | 4/2011 |
| JP | H0532897 | 9/1993 |

OTHER PUBLICATIONS

Co pending U.S. Appl. No. 16/424,721, filed May 29, 2019.
(Continued)

*Primary Examiner* — G.M. A Hyder
(74) *Attorney, Agent, or Firm* — Marc Van Dyke

(57) ABSTRACT

There is disclosed a layered article that can be used in indirect printing, in analog or digital processes. The layered article, when configured as a transfer member, may serve to receive an ink in any form, allow the ink to be treated so as to form an ink image, and permit the application of the ink image on a substrate. The transfer member comprises a support layer and an imaging layer, which may be formed of a silicon matrix including dispersed carbon black particles. Methods for preparing the same are also disclosed.

20 Claims, 2 Drawing Sheets

Related U.S. Application Data continuation-in-part of application No. PCT/IB2017/057556, filed on Nov. 30, 2017.

(51) Int. Cl.

| | | |
|---|---|---|
| *B41J 2/005* | (2006.01) | |
| *B41M 5/03* | (2006.01) | |
| *C08G 77/04* | (2006.01) | |
| *B41M 5/52* | (2006.01) | |
| *C08K 3/04* | (2006.01) | |
| *C09C 1/56* | (2006.01) | |
| *C08K 5/5419* | (2006.01) | |
| *C08K 5/544* | (2006.01) | |
| *C09C 3/10* | (2006.01) | |
| *G03G 15/16* | (2006.01) | |
| *C09D 7/40* | (2018.01) | |
| *C08L 83/04* | (2006.01) | |

(52) U.S. Cl.
CPC ............ *B41M 5/0256* (2013.01); *B41M 5/03* (2013.01); *B41M 5/52* (2013.01); *C08G 77/04* (2013.01); *C08K 3/04* (2013.01); *C08K 5/544* (2013.01); *C08K 5/5419* (2013.01); *C09C 1/56* (2013.01); *C09C 3/10* (2013.01); *G03G 15/162* (2013.01); *B41M 2205/06* (2013.01); *B41M 2205/10* (2013.01); *C01P 2004/04* (2013.01); *C01P 2004/50* (2013.01); *C01P 2004/61* (2013.01); *C01P 2004/62* (2013.01); *C01P 2006/12* (2013.01); *C01P 2006/19* (2013.01); *C08K 2201/005* (2013.01); *C08L 83/04* (2013.01); *C09D 7/66* (2018.01)

(58) Field of Classification Search
CPC .... C09C 1/56; G03G 15/162; B41M 2205/06; B41M 2205/10; B41M 5/52; B41M 5/025; B41M 5/0256; B41M 5/03; B41J 2/0057; C08G 77/04; C01P 2004/04; C01P 2004/50; C01P 2004/61; C01P 2004/62; C01P 2006/12; C01P 2006/19; C08L 83/04; C09D 7/66
See application file for complete search history.

(56) References Cited

U.S. PATENT DOCUMENTS

| | | |
|---|---|---|
| 10,606,191 B2 | 3/2020 | Landa et al. |
| 10,632,740 B2 | 4/2020 | Landa et al. |
| 2008/0166495 A1 | 7/2008 | Maeno et al. |
| 2012/0049123 A1 | 3/2012 | Wu |
| 2012/0103212 A1 | 5/2012 | Stowe et al. |
| 2013/0342622 A1 | 12/2013 | Imai et al. |
| 2014/0168336 A1 | 6/2014 | Mettu et al. |
| 2015/0015650 A1 | 1/2015 | Landa et al. |
| 2015/0022602 A1 | 1/2015 | Landa et al. |
| 2015/0024648 A1 | 1/2015 | Landa et al. |
| 2015/0070454 A1 | 3/2015 | Moorlag et al. |
| 2015/0092004 A1 | 4/2015 | Kanungo et al. |
| 2015/0118503 A1 | 4/2015 | Landa et al. |
| 2018/0200751 A1 | 7/2018 | Landa et al. |
| 2019/0094727 A1 | 3/2019 | Landa et al. |
| 2019/0308433 A1 | 10/2019 | Landa et al. |
| 2019/0315118 A1 | 10/2019 | Landa et al. |
| 2019/0322099 A1 | 10/2019 | Landa |
| 2019/0330476 A1 | 10/2019 | Landa et al. |
| 2020/0062002 A1 | 2/2020 | Anda et al. |

OTHER PUBLICATIONS

Co pending U.S. Appl. No. 16/464,782, filed Nov. 30, 2017.
Co pending U.S. Appl. No. 16/465,041, filed Nov. 30, 2017.
Machine Translation (by Espacenet and Google) for JPH0532897 published on Sep. 2, 1993 Watanabe S.

TRANSFER MEMBER FOR PRINTING SYSTEMS

CROSS-REFERENCE TO RELATED APPLICATIONS

This application is a continuation of U.S. patent application Ser. No. 16/424,712 which was filed on 29 May 2019 and is incorporated herein by reference in its entirety as if fully set forth herein. U.S. patent application Ser. No. 16/424,712 is a continuation-in-part of PCT/IB2017/057556, which was filed on 30 Nov. 2017 and is incorporated herein by reference in its entirety as if fully set forth herein. PCT/IB2017/057556 claims Paris Convention priority from PCT/IB2016/057226, which was filed on 30 Nov. 2016 and is incorporated by reference in its entirety as if fully set forth herein.

FIELD

The present disclosure relates to a transfer member for use in indirect printing and to use of the same.

BACKGROUND

Printing techniques can be classified into direct or indirect methods. In the former, the ink is directly deposited upon a printing substrate to form the desired ink image. In indirect processes, the ink is deposited on an intermediate member and subsequently transferred to the substrate, this intermediate member being therefore also termed an intermediate transfer member or simply a transfer member. Typically, the ink deposited thereon is modified or treated (e.g., dried, cured, fused, etc.) before being transferred as a so-called ink image to the substrate. Indirect printing can be analogue, the transfer member providing a particular ink image while being used in a print job (offset printing is one example of this type), or digital. Digital printing techniques have been developed that allow a printer to receive instructions directly from a computer, without the need to prepare printing plates.

A variety of digital printing processes exist, each differing in the kind of inks that may be used, the type of modification (if any) the ink deposited on the transfer member undergoes and the manner such transfer can be effected. For example, dry toners are used in the xerographic process, electrically chargeable inks are used in electrophotography, and so on. The inks, which generally include a coloring agent (e.g., a dye or a pigment) in a polymeric system, can be in dry form, paste form or liquid form, the liquid carrier, if any, being either aqueous or organic. The transfer members for such printing systems may be required to fulfil different characteristics, depending on the exact process in which they are to serve. Nevertheless, they may share common properties and structural principles. The present disclosure is concerned with the construction of a transfer member that may be employed inter alia in printing processes as detailed in WO2013/132418, WO2013/132420, WO2016/189512 and WO2018/100528, but may also find application in other indirect printing systems.

The transfer member described in the afore-mentioned applications may be a drum or a continuous loop belt which comprises a flexible blanket having an imaging layer, with a hydrophobic outer surface also referred to as a release layer, and a support layer. The present disclosure is particularly concerned with the preparation of the imaging layer, but should not be construed as being limited thereto.

SUMMARY

In a first aspect there is provided a transfer member for receiving ink and transferring an ink image to a substrate, the transfer member comprising:
  a) a support layer; and
  b) an imaging layer, disposed on the support layer, the imaging layer comprising:
    i) a hydrophobic silicone matrix comprising hydrophilic carbon black particles dispersed therein; and
    ii) a release surface distal to the support layer.

Advantageously the transfer member can be employed in a printing process and for use in printing apparatus for transferring ink from a coating station, where the ink can be deposited on the transfer member, to an impression station wherein an ink image can be transferred to a substrate. Typically, following its deposition on the transfer member, the ink is heated (e.g., via thermal conduction, convection or radiation means) to make it tacky at a position that is to be transferred to the substrate, thereby creating an ink image to be transferred. The carbon black particles dispersed within the silicone matrix have inter alia beneficial mechanical reinforcement, thermal conduction, electrical conduction and/or radiation absorbing properties for use in a printing system.

In a second aspect there is provided a transfer member as disclosed herein for use in indirect printing, wherein the indirect printing (which can be analogue or digital) is selected from offset printing, thermal printing, electrophotographic printing and radiation printing.

While in the following, the advantageous properties of CB particles in a transfer member are exemplified in the context of particular imaging stations, the layer where the CB particles are dispersed being accordingly termed an imaging layer, this should not be construed as limiting. Hence, in addition or instead of facilitating, in one embodiment, the formation of an ink image at an imaging station, the CB particles may confer properties desired at other stations of a printing system, or even independent of any particular station. For instance, the former case can be illustrated by a transfer member, having a layer of silicon wherein the dispersed CB particles serve to absorb IR radiation of an IR dryer. When CB particles are used to grant mechanical characteristics to a transfer member, such properties could benefit the transfer member along the entire printing path followed by the transfer member or at least at a number of stations along the path.

In one embodiment, the release surface is integral to the imaging layer. As employed herein integral means that the release surface is the outermost surface of the imaging layer. That is, the imaging layer has the properties, and performs the function of, the release layer. There is no additional release layer on top of the imaging layer.

In another embodiment, the release surface is a layer formed on the imaging layer. As employed herein the release surface may be an additional layer laid down on top of the imaging layer, thus is a separate layer. Where the release surface is a release layer it may be formed of the same or different materials to the imaging layer. Preferably, if the imaging layer is prepared by a particular curing method (e.g., addition-curing or condensation-curing), the additional layer of the release surface is prepared by the same curing method.

Release surface (layer) may be used interchangeably with imaging surface to refer to the surface directly in contact with the ink, when the transfer member is installed in an operating printing system.

In one embodiment, the imaging layer is a layer formed from liquid silicone resins (LSR), room temperature vulcanization (RTV) silicones, polydialkyl siloxanes (PDAS) or polydimethyl siloxanes (PDMS) silicones, and functionalised versions thereof. Suitable silicone polymers, simply termed silicones, which form the silicone matrix once cured, are described below.

In one embodiment, the release surface is hydrophobic.

In one embodiment, the release surface is hydrophilic.

In one embodiment, the silicone matrix is an addition-cured silicone matrix. Suitable addition-cured silicones are described below.

In one embodiment, the silicone matrix is a condensation-cured silicone matrix. Suitable condensation-cured silicones are described below.

In one embodiment, the hydrophilic carbon black particles dispersed in the silicone matrix have one or more properties selected from the list consisting of:
 a) an $I_D/I_G$ ratio of at least 0.8, or at least 1.0, or at least 1.2, wherein $I_D$ and $I_G$ represent the peak intensity maxima of D-band and G-band, respectively, as determined by Raman spectroscopy; and
 b) an average primary particle size (Dv50) of at most 100 nm.

In one embodiment, the $I_D/I_G$ ratio of the carbon black particles is at least 0.9, 1.0, 1.1, 1.2, 1.3, 1.4 or 1.5.

In one embodiment, the average primary particle size (Dv50) of the carbon black particles is at most 10, 20, 30, 40, 50, 60, 70, 80, 90 or 100 nm. In other embodiments, CB particles having an average primary particle size (Dv50) of at most 110, 120, 130, 140, 150, 160, 170, 180, 190, 200, 250, 300, 350, 400, 450 or 500 nm are used.

While, in an ideal situation, all particles could be dispersed in the form of individual primary particles, this is rarely the case in practice. Primary particles generally agglomerate to form secondary particles or clusters. While particles (whether individuals or clusters) can be characterized by the average size of half of the population (D50), as the dimensions of the clusters may be of enhanced importance for the function and/or efficiency of the dispersed carbon black. It is preferred to refer to the size of a predominant portion of a population of clusters, the predominant portion being determined for 90% of the population by volume. This measure, which can be based on the volume of the particles, can also be termed the predominant measured cluster size (Dv90). Dv50 and Dv90 as employed herein are described in more details below.

In one embodiment, the predominant measured cluster size (Dv90) of the carbon black particles is at most about 5 µm, at most about 4 µm, at most about 3 µm, at most about 2 µm or at most about 1.5 µm, such as at most about: 1.6, 1.7, 1.8, 1.9, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.1, 4.2, 4.3, 4.4, 4.5, 4.6, 4.7, 4.8 or 4.9 µm.

In one embodiment, the predominant measured cluster size (Dv90) of the carbon black particles is at most about 1000 nm, at most about 500 nm, at most about 400 nm, at most about 300 nm, at most about 200 nm or at most about 100 nm, such as at most about: 50, 150, 250, 350, 450, 550, 600, 650, 700, 750, 800, 850, 900 or 950 nm.

In one embodiment, the imaging layer has a thickness of 25 µm or less, such as 24, 23, 22, 21, 20, 19, 18, 17, 16, 15, 14, 13, 12, 11, 10, 9, 8, 7, 6, 5, 4, 3, 2, 1 µm or less. In alternative embodiments, the imaging layer has a thickness of at least 25 µm and at most 500 µm, 400 µm, 300 µm, 250 µm, 200 µm or 100 µm. In further embodiments, the layer of silicone matrix wherein the CB particles are dispersed can be of a few millimeters (e.g., at least 500 µm and at most 5 mm, 4 mm, 3 mm, 2 mm or 1 mm).

In one embodiment, the concentration of carbon black particles in the silicone matrix is at least 0.1% to at most 30% w/w. In some embodiments, the weight per weight concentration of the carbon black particles within the silicone matrix is between 5% and 30%, between 7.5% and 27.5%, between 10% and 25%, between 12.5% and 25%, between 15% and 25%, or between 15% and 20%.

In one embodiment, the concentration of carbon black in the silicone matrix is at least 0.1% w/w. Such as at least 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28 or 29% w/w.

In one embodiment, the concentration of carbon black in the silicone matrix is at most 30% w/w. Such as at most 0.5, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28 or 29% w/w.

In one embodiment the silicone matrix further comprises a dispersant having at least one carbon-black-affinic (CB-affinic) moiety.

As employed herein a carbon-black-affinic moiety means a moiety with affinity to hydrophilic carbon black. The hydrophilic surface of CB generally results from oxygen-based functional groups, such as epoxy, hydroxy or carboxylic groups. Suitable CB-affinic moieties include an amino-moiety (as in amino-silicone dispersants), an acrylate-moiety (as in acrylate-silicone dispersants) and an epoxy-moiety (as in epoxy-silicone dispersants).

In one embodiment, the dispersant containing the at least one CB affinic moiety is, includes, mainly includes or consists essentially of a hydrophobic dispersant having a branched molecule structure, the branched molecule having a backbone and at least one branching unit, wherein one of said backbone and branching unit is siloxane-based or contains at least one siloxane unit. If the branching units are only positioned at terminal ends of the backbone of the dispersant, the molecule might be considered linear. However, the term "branched molecule" is used herein to also encompass such type of substitution.

In the present context, the dispersant (which in view of its siloxane content can also be termed a silicone dispersant) is said to be hydrophobic if miscible with the silicone matrix, in a manner to be detailed below.

Similarly, the at least one CB-affinic moiety can be disposed within the backbone or within the branching unit(s). While generally, the siloxane-based chain and the CB-affinic moieties are each disposed on separate "mono-type" components of the branched molecule (e.g., the dispersant having a siloxane-based backbone and CB-affinic moieties on branching units, or vice versa: CB-affinic moieties disposed within the backbone and siloxane-containing branching units) this "segregation" is not necessary. Suitable silicone dispersants may for example have disposed within their backbone both siloxane units and CB-affinic moieties, forming a "poly-type" backbone, the branching units stemming from any of the foregoing mono-type or poly-type backbone being also possibly a combination of siloxane-containing branching units and CB affinic branching units.

In one embodiment, the at least one carbon-black-affinic moiety of the silicone dispersant is disposed within the branching units of the branched structure, the backbone of the dispersant being a siloxane-based backbone.

In one embodiment, the at least one carbon-black affinic moiety is disposed within the backbone of the silicone dispersant, at least a portion of the branching units of the dispersant being siloxane-containing branching units.

In one embodiment, the carbon-black-affinic moiety is selected from an amino-moiety, an acrylate-moiety and an epoxy-moiety.

In one embodiment, the dispersant is selected from the group consisting of: an amino-silicone dispersant, an epoxy-silicone dispersant and a silicone-acrylate dispersant.

As used herein in the specification and in the claims section that follows, the term "siloxane" refers to the functional group illustrated in Formula (1)

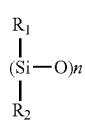

(1)

wherein $R_1$ and $R_2$ are independently selected from H and Alkyl. n is between 30 and 1500, 30 and 1000, 40 and 750 and 40 and 600.

As used herein in the specification and in the claims section that follows, the term "siloxane-containing" with regard to a dispersant molecule, refers to a dispersant molecule having at least one siloxane unit.

As used herein in the specification and in the claims section that follows, the term "siloxane-based" with regard to a dispersant molecule, refers to a dispersant molecule having at least one of:

(i) at least 10 wt. % siloxane, and more typically, at least 20 w.%, at least 35 weight %, at least 50 weight %, at least 60 weight %, or at least 70 wt. % siloxane; and (ii) sufficient siloxane groups to be identified by FTIR analysis of the dispersant, or of a composition containing the dispersant and carbon black.

As used herein in the specification and in the claims section that follows, the term "miscible" and the like, with regard to a dispersant in a solvent or matrix, refers to a dispersant solubility, measured at room temperature (25° C.), that is at least 0.03% on a weight basis, i.e., the dispersant weight divided by total weight (dispersant weight+weight of the solvent/matrix) in a pure component system. Specifically, with regard to a dispersant in a curable, hydrophobic silicone pre-polymer, "miscible" and the like refers to a dispersant solubility that is at least 0.03% on a basis of dispersant weight divided by the total weight of the dispersant and the curable, hydrophobic silicone pre-polymer.

Typically, to be suitable and adapted for the present compositions, a dispersant should be selected to have a dispersant solubility, by weight, of at least 3%, or at least 5%, and more typically, of at least 7%, at least 10%, at least 12%, at least 15%, at least 20%, or at least 25%. In many cases, this dispersant solubility is at most 70%, at most 60%, at most 50%, at most 40%, at most 35%, or at most 30%.

A dispersant solubility of suitable dispersants, in weight %, is typically at least 0.3 times the weight % of the CB in the composition, and more typically, at least 0.5, at least 0.7, at least 0.8, at least 0.9, or at least 1.0 times the weight % of the CB in the composition.

The solubility of the dispersant in the curable composition at the aforesaid concentrations and/or weight ratios with respect to additional constituents (e.g., CB particles) is such that phase separation is avoided. In other words, a dispersant is miscible in a solvent or in a composition comprising silicone pre-polymers and carbon black particles if all constituents substantially form a single phase.

The term pre-polymer relates to uncured reactive constituents of the silicone matrix that may cross-link to form the imaging layer, the cross-linking process being also known as curing. The curing can be performed in presence of adequate curing agents and under any curing condition appropriate for the curable composition comprising the pre-polymers and any desired curing agent adapted thereto.

As used herein in the specification and in the claims section that follows, the term "non-reactive amino-silicone oil" refers to an amino-silicone oil that fulfills at least one, and preferably both, of the following structural properties: (i) the amino-silicone oil is devoid of silanol and alkoxy groups; and (ii) the amino-silicone oil is non-reactive with respect to vinyl and silanol moieties, at typical addition-curing temperatures (such as from about 90° C. to about 200° C.), or at the actual, utilized addition-curing temperature.

In one embodiment, the transfer member is opaque. Exemplary opaque transfer members are described below.

In one embodiment, the transfer member is substantially transparent. Exemplary transparent transfer members are described below.

In one embodiment, the support layer is substantially transparent.

In one embodiment the transfer member further comprises one or more layers selected from the group comprising: a conformable layer, a compressible layer, an adhesive layer and a friction layer. Additional layers may be required for particular transfer members and the function and characteristics of any such layer are known to persons skilled in the preparation and use of such transfer members. For non-limiting examples of layers and structures of transfer members, the interested reader may consult WO2013/132432.

In one embodiment, the support layer is rigid, such as a drum or a plate. In one embodiment the rigid support layer is a drum. In one embodiment the rigid support layer is a plate.

In one embodiment the support layer is flexible, such as a blanket or an endless belt. In one embodiment the flexible support layer is a blanket. In one embodiment the flexible support layer is an endless belt.

In one embodiment, the imaging layer is adherent to the support layer.

In one embodiment, the transfer member further comprises, along lateral edges of the transfer member, protruding formations which are capable of engaging with lateral tracks in a printing system so as to (a) constrain the transfer member to follow a printing path in at least a segment of the path and/or to (b) place the transfer member under lateral tension, in at least a segment of the path.

In one embodiment the formations on at least one of the lateral edges are (a) a plurality of formations that are spaced from one another along the length of the transfer member or (b) a continuous formation along the entire length of the lateral edge, the formations optionally having a thickness greater than the transfer member.

In one embodiment the formations are (a) made of a material having a low friction coefficient to ensure smooth running of the formations within the lateral tracks and/or (b) made of a material, or comprise an agent, or are coated with a coating having lubricating properties.

In one embodiment, the transfer member further includes one or more markings detectable by a sensor of a printing system.

For non-limiting examples of formations that may protrude from the edges of transfer members to assist in their attachment, guidance, and/or tensioning, and for illustration of uses of markings and detectors during a printing process, the interested reader may consult WO2013/136220.

In one embodiment, the transfer member is a seamless transfer member. Seamless transfer members may be prepared by any suitable method, including centrifugation casting.

In one embodiment, at least 80% of the carbon black particles, are disposed at a distance of at least 0.01 μm, at least 0.02 μm, at least 0.03 μm, at least 0.04 μm, at least 0.05 μm, at least 0.1 μm, at least 0.2 μm, at least 0.3 μm, at least 0.5 μm, or at least 1.0 μm, from the release surface.

According to some aspects of the disclosure, embodiments of the transfer member may be used in a printing apparatus as described in WO2016/189512 and in co-pending PCT/IB2017/057535, filed on Nov. 30, 2017, which are incorporated herein by reference in their entirety.

It will be appreciated by the skilled person that, although the transfer member disclosed herein is exemplified for use in receiving ink at an imaging station of a printing system, and typically transferring an ink image at a transfer station, the transfer member may have other applications in the printing industry. In some applications, the transfer member may be used to contact ink or an ink image, without retaining the ink, not serving in effect to transfer an ink image. By way of non-limiting example, the transfer member can serve as contacting surface to apply for instance a chemical or physical treatment to the area contacted therewith.

It will be appreciated by the skilled person that, although the transfer member disclosed herein is exemplified for use in a printing system, the transfer member may have applications other than within printing. For instance, a transfer member according to the present teachings may serve as conveyor of objects, other than ink images, in a variety of other industries. By way of non-limiting example, the transfer member can serve in the food industry, for instance in continuous baking ovens.

Any such articles of manufacture can be viewed as layered articles, hence in one aspect the present invention provides a layered article comprising:
  a) a support layer; and
  b) a functional layer, disposed on the support layer, the functional layer comprising:
    i) a cured hydrophobic silicone matrix comprising hydrophilic carbon black particles non-covalently dispersed therein; and
    ii) a release surface distal to the support layer.

Methods for preparing such layered articles, which in one embodiment can be adapted to a printing system and that can serve, in a particular embodiment, as a transfer member, the matter being transferred optionally including an ink, are also encompassed. Hence in a further aspect, the present invention provides a method for preparing a transfer member, the transfer member comprising on a first side a release surface for receiving ink and transferring an ink image to a substrate, the method comprising:
  a) providing a support layer adapted to form a rear side of the transfer member, the rear side being opposite the first side;
  b) providing an imaging layer, the imaging layer including a hydrophobic silicone matrix comprising hydrophilic carbon black particles non-covalently dispersed therein;
  c) optionally providing a release layer able to form the release surface;
  d) contacting the support layer, the imaging layer and the optional release layer, when at least one of any two adjacent said layers is at least partially cured; and
  e) fully curing the transfer member including said layers so that the surface distal to the support layer forms the release surface, said surface being part of the imaging layer or of the release layer.

The terms "tacky" and "sufficiently tacky" as used herein are not intended to mean that the ink, whether formed of droplets or of particles, is necessarily tacky to the touch but only that it is softened sufficiently to enable its adhesion to the surface of a substrate when pressed against it in the transfer station. The ink droplets or particles rendered tacky are believed to form individual films or contiguous films which following their transfer to a (printing) substrate may optionally yield thinner films, as a result of the pressure being applied upon contacting of the release surface (or part thereof) to the substrate (or a corresponding part thereof) and/or of the optional further processing (e.g., fusing, drying, curing, etc.) of the transferred films.

In some embodiments, the ink is selectively deposited upon the transfer member in a pattern corresponding to the ink image being rendered tacky. In other embodiments, the ink (in a particular embodiment, the ink being in the form of thermoplastic particles) is coating the transfer member in a non-selective manner Selected regions of the ink coating are then rendered tacky in a pattern corresponding to the desired ink image. Either way, the imaging station is said to be selectively forming the ink image. In the ink image, the ink droplets or particles are generally viewed as discs of colored resins, such films being typically substantially devoid of liquid carrier, if any, at the time of transfer. The constituents of an ink image of tacky ink can be termed image dot, independently of the form of the ink from which they originate or type of treatment which led to their formation.

In some embodiments, the ink can be directly applied to the imaging surface by jetting, for instance by using print heads for liquid inks or spray heads for particulated inks. In alternative embodiments, the particles can be applied to an intermediate applicator and from it to the imaging surface. The latter type of application is said to be indirect and both direct and indirect application of inks to the imaging surface are encompassed in the present disclosure.

As employed herein the imaging surface refers to the uppermost surface of the transfer member which receives the ink/particles. Typically, this surface is the release surface which may or may not be integral to the imaging layer.

When the printing system relies on an imaging station selectively heating particles, to render desired regions of the particle coating tacky, the particle coating may preferably be a monolayer. In order to facilitate replenishment of the particle coating on the imaging surface after each impression, and transfer of selected regions, particles that adhere to the imaging surface more strongly than they do to one another are utilized. This results in an applied layer that is substantially a monolayer of individual particles. Stated differently, the applied layer is only one particle deep over a major proportion of the area of the imaging surface and most, if not all, of the particles have at least some direct contact with the imaging surface.

Thus, in one embodiment the imaging surface is hydrophobic. Hydrophobic surfaces advantageously permit the transfer of the film/ink/particles/image dots to the substrate by releasing it/them from the imaging surface.

In some embodiments, the image dot laid down on the imaging surface of the transfer member and resulting, for example, from the drying of ink droplets or from conversion of the monolayer of particles by exposure to radiation, said dot has a thickness of 2 µm or less, or of less than 1 µm, or even of less than 750 nm. In other embodiments, the thickness of the image dot is of 100 nm or more, or of more than 200 nm, or even of more than 300 nm. The thickness of the image dot may be in the range of 300 nm-1,000 nm, or of 500 nm-1,500 nm, or of 600 nm-800 nm, or of 700 nm-1,000 nm. For example, approximately 100, 150, 200, 250, 300, 350, 400, 450, 500, 550, 600, 650, 700, 750, 800, 850, 900 or 950 nm. As pressure is typically applied during transfer of the image dots from the imaging surface to the substrate, the corresponding printed dots may be thinner. However, as in some embodiments, the transfer is performed with image dots that are substantially dry ahead of transfer, the degree of expansion of the dot on the substrate and its lamination do not significantly affect the afore-said thickness.

The ink droplets that may be employed with transfer members of the disclosure may have any volume adapted to the intended printing process. For instance, ink droplets being jetted on the release surface may have a volume of 100 picoliter (pl) of less, of 75 pl of less, of 50 pl of less, or of 25 pl of less. The thermoplastic particles that may be employed with transfer members of the disclosure may have a particle size of less than 10 µm, or less than 5 µm, or less than 1 µm, or within the range of 100 nm to 4 µm, or 300 nm to 1 µm, or 500 nm to 1.5 µm.

To permit the printing of patterns in selected regions of the substrate, the affinity of the tacky image dots to the substrate needs to be greater than to the imaging surface. Moreover, when imaging is selectively done on a particle coating, the relatively higher affinity of the tacky particle to the substrate in the selected regions shall also be greater than the affinity of the substrate to the particles not rendered tacky.

Such gradient of affinities between the ink (before and after modification, such as by heating), the ink carrier (including the fluid carrying the native particles), the imaging surface, and the printing substrate can be modulated by selection of suitable materials or characteristics, such as hydrophobicity, hydrophilicity, charge, polarity and any such properties known to affect interaction between any two elements.

For assisting in the transfer of the tacky film of image dots from the imaging surface to the substrate, the imaging surface may be hydrophobic.

Advantageously, the imaging surface is compatible with the ink, its carrier and the type of treatment to be applied, if any, to transform the ink into the desired ink image on the transfer member. Taking for example a treatment resulting from exposure to energy intermittently applied by the imaging station to heat desired selected areas. Indications of the compatibility of an imaging surface and/or of a transfer member comprising it, include, for instance, that if the energy is electromagnetic (EM) radiant energy, such as a laser beam, the imaging surface is relatively resistant and/or inert to the radiation at the irradiated frequency/wavelength range, and/or able to absorb or reflect the radiation, and/or able to conduct or insulate the heat that can be generated by the radiation.

In some embodiments, the image dots (generally formed of residues of ink polymers and coloring agents) and the thermoplastic particles may themselves be hydrophobic. In such case, the relative affinity between the image dots or the particles in their different states and the imaging surface can be based on hydrophobic-hydrophobic interactions.

In some embodiments, the thermoplastic particles and/or the imaging surface can alternatively and additionally achieve desired relative affinity one to another (and to any other fluid or surface suitable for a printing process according to present teachings) by way of charge-based interactions. For instance, positively charged particles may favor negatively charged surfaces. In such case, the relative affinity between the particles in their different states and the imaging surface can be based on charge-charge interactions.

In one embodiment, the temperature of the imaging surface can be raised above ambient temperature, the temperature increase being brought about by a heater. In some embodiments, the heater is positioned on the exit side or downstream of the imaging station. In such embodiments, the temperature of the outer surface of the imaging surface can be greater than 30° C., or greater than 40° C. or even greater than 50° C., but typically lower than 90° C., lower than 80° C., or even no more than 70° C.

In some embodiments, the temperature of the imaging surface can be lowered, the temperature reduction being brought about by a cooler, such as a cold air blower or a cold plate, by way of example. The cooler may be positioned on the entry side or upstream of the imaging station. In such embodiments, the temperature of the outer surface of the imaging surface can be less than 50° C., less than 40° C., or less than 30° C., or even less than 20° C., but typically above 0° C., or even above 10° C.

If specific temperature regimen are desired for any particular printing process, transfer members according to the present teachings shall be selected and adapted to be compatible and resistant with such temperatures.

In one embodiment, there is herein disclosed a transfer member for receiving ink particles, and for transferring the ink particles as an ink image to a printing substrate, the transfer member comprising:
  a) a support layer; and
  b) an imaging layer, disposed on and adherent to the support layer, the imaging layer comprising:
    I) a release surface distal to the support layer;
    II) a silicone matrix including the release surface; and
    III) carbon black particles having an average primary particle size (D50) of at most 100 nm;
  the carbon black particles being dispersed within the silicone matrix such that an average measured particle size (D50) is at most 400 nm; wherein a concentration of the carbon black particles within the silicone matrix is at least 0.01%, by weight.

In some embodiments, the imaging layer further comprises a conformable layer.

In some embodiments, the conformable layer is directly adherent to the support layer.

In some embodiments, the imaging layer includes the conformable layer, which is adherent to or directly adherent to the support layer.

In some embodiments, the conformable layer has a hardness of up to 50 Shore A.

In some embodiments, the conformable layer has a hardness within a range of 5 to 50, 10 to 30, 10 to 40, 10 to 50, 15 to 50, 20 to 40, or 20 to 50 Shore A.

In some embodiments, the support layer includes a compressible layer.

In some embodiments, the compressible layer is disposed between the imaging layer and a base layer of the support layer.

In some embodiments, the compressible layer includes a compressible elastomer.

In some embodiments, the compressible layer includes a sponge or foam structure.

In some embodiments, the transfer member is adapted and dimensioned such that the transfer member has a compressibility of 100-500 μm, 100-400 μm, 100-300 μm, 150-300 μm, or 150-250 μm in a direction normal to the imaging layer.

In some embodiments, the compressible layer has a compressibility of 10-80% in a direction normal to the large plane of the compressible layer.

In some embodiments, the silicone matrix contains tin. The presence of tin in the silicon matrix may suggest a condensation-cured matrix.

In some embodiments, the silicone matrix contains platinum. The presence of platinum in the silicon matrix may suggest an addition-cured matrix.

In some embodiments, the silicone matrix contains at least one type of functional group selected from the group consisting of amine, amide, epoxy and acrylate moieties, as detected by Fourier-transform infrared (FTIR) spectroscopy. The presence of such groups in the silicone matrix may suggest the use of dispersants having carbon-black-affinic moieties according to the present teachings.

The afore-mentioned transfer member comprising an imaging layer comprising a silicone matrix and carbon black has a wide range of applications in a variety of industrial fields (e.g., in fields where CB can serve for its mechanical properties, for its heat conductive properties, for its electrical conductive properties, and any such known properties of this material). In some embodiments, the carbon black containing transfer member or method of preparing the same can be used for the printing industry, whether digital or traditional. In particular embodiments, the carbon black containing transfer member or method of preparing the same can be used for the preparation of radiation absorbing layers or imaging surfaces of transfer members.

BRIEF DESCRIPTION OF THE DRAWINGS

Some embodiments of the transfer member are described herein with reference to the accompanying drawings. The description, together with the figures, makes apparent to a person having ordinary skill in the pertinent art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures may not be drawn to scale.

In the Figures.

DETAILED DESCRIPTION

Particle Size Determination

Figure 1:
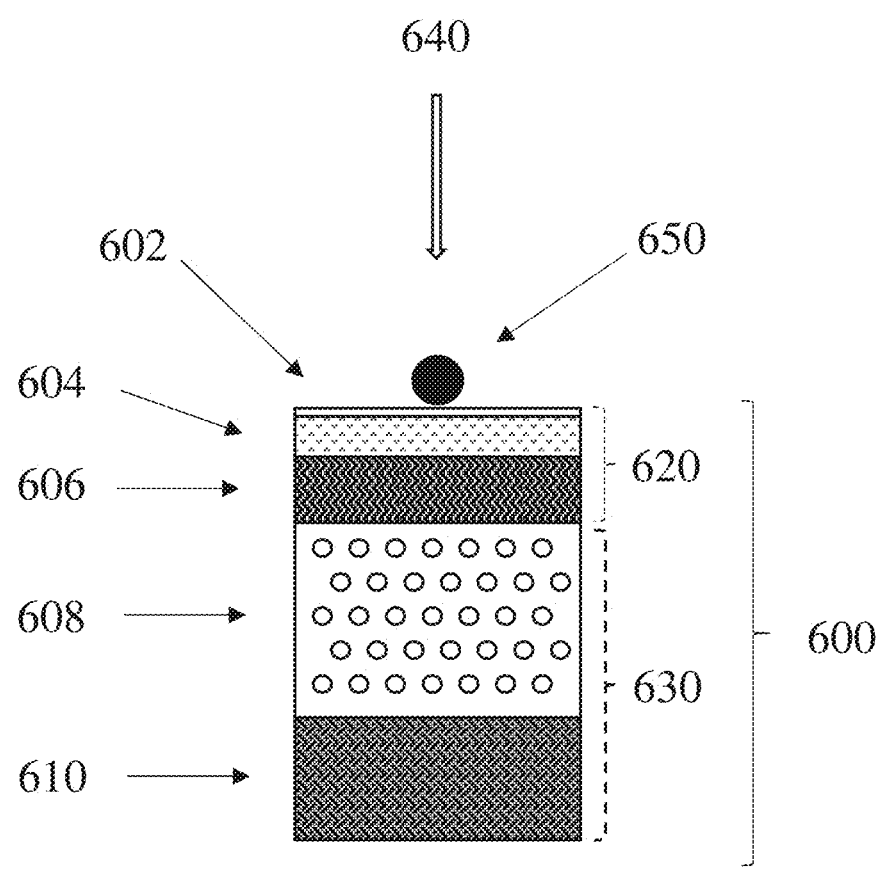
FIG. 1 is a schematic representation of an "opaque" transfer member according to particular embodiments of the invention.

The present invention is concerned, inter alia, with the dispersion of particles. The dimension of particles in X-Y-Z directions can be individually assessed, however are typically provided for a population of particles. The population can be found in a representative field of view, when the dimensions are measured by microscopy, or in a representative suspension of the particles, when the dimensions are measured by Diffractive Light Scattering (DLS). D10, D50 and D90, which represent the size distribution of the particles for 10%, 50% or 90% of the population can be assessed, for instance, by volume of particles, in which case they may be provided as Dv10, Dv50 and Dv90. The foregoing measurements can be obtained by DLS techniques when the samples to be studied are suitably fluid. However, when the particles under study are in viscous media or in cured matrices, then typically such measurements are performed by microscopy.

Such characteristic dimensions are generally provided by the suppliers of such particles and can be assessed on a number of representative particles by methods known in the art, such as microscopy, including, in particular, by light microscope for particles of several microns or down to estimated dimensions of about 200 nm, by scanning electron microscope SEM for smaller particles having dimensions of less than 200 nm (SEM being in particular suitable for the planar dimensions) and/or by focused ion beam FIB (preferably for the thickness and length (long) dimensions of nanoparticles). While selecting a representative particle, or a group of representative particles, that may accurately characterize the population (e.g., by diameter, longest dimension, thickness, aspect ratio and like characterizing measures of the particles), it will be appreciated that a more statistical approach may be desired. When using microscopy for particle size characterization, a field of view of the image-capturing instrument (e.g., light microscope, SEM, FIB-SEM etc.) is analyzed in its entirety. Typically, the magnification is adjusted such that at least 5 particles, at least 10 particles, at least 20 particles, or at least 50 particles are disposed within a single field of view. Naturally, the field of view should be a representative field of view as assessed by one skilled in the art of microscopic analysis. The average value characterizing such a group of particles in such a field of view is obtained by volume averaging.

The Imaging Layer

The imaging layer in some embodiments has a hydrophobic release surface, made typically of an elastomer that can be tailored to have properties as herein disclosed, generally prepared from a silicone-based material. The silicone-based matrix and layer therefrom may have any thickness and/or hardness suitable to bond the intended particles or to retain the intended ink droplets. In printing systems using particulated ink, the suitable hardness is to provide a strong bond to the particles when they are applied to the imaging surface, the bond being stronger than the tendency of the particles to adhere to one another. It is believed that for relatively thin imaging layers (e.g., 100 μm or less), the silicone-based material may have a medium to low hardness; whereas for relatively thick imaging layers (e.g., up to about 1 mm), the silicone-based material may have a relatively high hardness. In some embodiments, a relatively high hardness between about 60 Shore A and about 80 Shore A is suitable for the imaging surface, such as approximately 61, 62, 63, 64, 65, 66, 67, 68, 69, 70, 71, 72, 73, 74, 75, 76, 77, 78 or 79 Shore A. In other embodiments, a medium-hardness of approximately 60, 50 or 40 Shore A is satisfactory, such as approximately 41, 42, 43, 44, 45, 46, 47, 48, 49, 50, 51, 52, 53, 54, 55, 56, 57, 58, 59 Shore A. In some embodiments, low hardness, below 40, 30, 20 or even 10 Shore A is satisfactory, such as 11, 12, 13, 14, 15, 16, 17, 18, 19, 20, 21, 22, 23, 24, 25, 26, 27, 28, 29, 30, 31, 32, 33, 34, 35, 36, 37, 38, or 39 Shore A or lower, for example 1, 2, 3, 4, 5, 6, 7, 8 or 9 Shore A. In a particular embodiment, the imaging layer has a hardness of about 30-40 Shore A, a lower hardness believed to be preferable for spherical particles. The hardness is of at least 5 Shore A. While detailed for the retention of particulated inks, the skilled person can readily appreciate that selecting a desired hardness for a particular printing process can also assist in transfer of image dots originating from liquid ink droplets.

The hydrophobicity of the release surface (whether integral to the imaging layer or not) enables the tacky film created by exposing the ink to radiation or alternate energy source to transfer cleanly to the substrate without splitting. A surface is said to be hydrophobic when the angle formed by the meniscus at the liquid/air/solid interface, also termed wetting angle or contact angle, exceeds 90°, the reference liquid being typically distilled water. Under such conditions, which are conventionally measured using a goniometer or a drop shape analyzer and can be assessed at a given temperature and pressure of relevance to the operational conditions of the coating process, the water tends to bead and does not wet, hence does not adhere, to the surface.

Advantageously, an imaging layer suitable for use with a printing system can be flexible enough to be mounted on a drum, appropriately extendible or inextensible if to be mounted as a belt, have sufficient abrasion resistance and/or resilience, be inert to the particles and/or fluids being employed, and/or be resistant to any operating condition of relevance (e.g., irradiation, pressure, heat, tension, and the like).

In particular embodiments, the silicone matrix of the imaging layer, can absorb radiant energy, including at the wavelength of laser emitting elements, if constituting an imaging station. For instance, if the radiation is emitted in any portion of the near infrared (NIR) range within about 800-2,000 nm, then the imaging layer preferably absorbs over at least such portion of the NIR spectrum. In such case, the heating up of the imaging layer can assist in the softening of the (ink) particles disposed thereupon, sufficient heating rendering the (ink) particles suitably tacky so as to transfer to a printing substrate upon impression. In some embodiments, the desired tackiness can be achieved by using (ink) particles comprising a polymer and/or a pigment being tuned to the wavelengths of the laser elements of the imaging device, so as to directly heat up and soften upon exposure to the laser, and by selecting a suitable imaging surface.

Advantageously, when desired tackiness is to be promoted, enhanced or achieved by proper selection of the imaging layer, the material forming the release surface is such that it may absorb over a relatively wide range of laser wavelengths, compatible with different types of (ink) particles, each eventually having a different sub-range, even minute ones, of laser absorbance. Carbon black (CB), which has a broad absorption and is a strong absorber in the NIR region, can be used to provide desired corresponding properties to the absorbing layer of the imaging layer.

Incorporation of carbon black into silicone-based layers may also contribute to the thermal conductivity of the imaging layer and allows to modulate it, if and as desired. Therefore, transfer members comprising an imaging layer as herein described can serve in printing systems relying more generally on application of thermal energy to render the ink tacky. Silicone-based elastomers comprising CB particles and methods of preparing the same are detailed in the following sections.

The imaging layer may form the outer surface of a drum, which can be either directly cast thereupon or mounted as a sleeve separately manufactured. This, however, is not essential as it may alternatively be the surface of an endless transfer member having the form of a belt guided over guide rollers and maintained under an appropriate tension at least while it passes through an imaging station.

The transfer member, whether formed as a sleeve over a drum or a belt over guide rollers, may comprise in addition to the imaging layer, on the side opposite the release surface, a body or support layer. The transfer member body or support layer may comprise different layers each providing to the overall transfer member one or more desired properties selected, for instance, from mechanical resistivity, thermal conductivity, compressibility (e.g., to improve "macroscopic" contact between the imaging surface and the impression cylinder), conformability (e.g., to improve "microscopic" contact between the imaging surface and the printing substrate at a transfer station) and any such characteristic readily understood by persons skilled in the art of printing transfer members.

The imaging layer may harbor more than the release ability it can, in a particular printing system, provide to irradiated tacky thermoplastic particles to transfer and the radiation related functionality (e.g., radiation absorbing properties) which can facilitate the process of rendering tacky the particles selectively subjected to irradiation. In alternative, printing systems, the carbon black particles dispersed in the imaging layer may provide for different or additional functionalities to the transfer member. For example, the electric conductance of the CB particles may serve to prepare an imaging layer having desired electrical conductivity or insulating properties, or anti-static ones. The thermal conductance of the CB particles may serve to prepare an imaging layer which may additionally serve either as a thermal reservoir or as a thermal insulator. The CB particles may also serve to provide mechanical properties to the imaging layer, serving as a reinforcement filler. The CB particles may also be considered for their pigment properties, providing the imaging layer a desired tint. Additional uses of CB particles for imaging layers are known to the skilled persons.

Thus, while in the description, the contribution of CB particles to imaging layers is often described in the context of radiation absorption, the term of "radiation absorbing layer" should not be construed as limiting the use of the transfer member for this unique purpose. Therefore, unless otherwise dictated from context, the term "radiation absorbing layer" can be interpreted to encompass any "imaging layer" allowing to form an ink image on a release surface according to any printing process wherein the CB particles may improve the performance of the transfer member as compared to a similar transfer member lacking CB particles.

Furthermore, the imaging layer can, for instance, be made of a material providing sufficient conformability, integrating the "conformable layer", or "conformational layer", to its "release surface" and "radiation absorbing layer" functionalities. Conversely, the latter two functions may be provided by two distinct layers, the release surface being a release layer (which will be in contact with the ink droplets or the particles) and an underneath radiation absorbing layer. Thus, an imaging layer can be a single/unique layer encompassing at least both release and radiation derived functions, optionally supplemented by conformational ability during impression. Alternatively, the imaging layer may be formed from at least two distinct layers selected from the group comprising release layers, radiation absorbing layers and conformable layers. In the event, the imaging layer consists of the three afore-mentioned types of layers (named by their predominant function), then it may be preferred to have them ordered such that the release layer may contact the particles, the radiation absorbing layer would be next (reducing the distance with the particles on the imaging surface outer side) and the conformational layer would be last, this layer being typically attachable or attached to a support. The support, as mentioned, can be rigid (e.g., the surface of a drum or any like mechanical part) or flexible (e.g., the body of a belt).

Furthermore, the transfer member can be substantially transparent or opaque, with respect to the wavelengths of the source of energy imparted thereto. Taking for example a printing system wherein the imaging station is formed by laser element selectively targeting a particle coating, laser beams having a relatively wide range of emissions may be preferred, a transfer member is advantageously "transparent" or "opaque" over a similar range. Assuming for instance, a laser emitting in the range of 800 nm to 2,000 nm or a portion thereof, this radiation source being positioned on the "rear side" or "under side" of the transfer member opposite to the imaging layer, a "transparent" member would allow sufficient progression of such beam from the rear side across member thickness, or at least until such beam reaches the radiation absorbing layer of the transfer member, over at least the same portion of the range. Conversely, an "opaque" member would block or reduce such beam progression to an extent that the radiation absorbing layer can no longer enable softening of the particles to a point they are tacky enough for transfer. It is to be noted that a transfer member that is opaque when irradiated from its rear side, can be transparent when subjected to irradiation from the imaging surface side, which may also be referred to as the front side or top/upper side. Differing indices of refraction between layers of the transfer member may also determine the transfer characteristic of such member. The characteristics of transparent and opaque transfer members, their respective transparency or lack thereof being considered in the context of irradiation from the rear side, are discussed in more details below.

Opaque Transfer Member

An opaque transfer member 600 is schematically illustrated in FIG. 1 by way of an exemplary cross-section through its layers. For convenience, a source of irradiation 640 and a single particle 650, which for clarity are not drawn to scale, are shown to illustrate how transfer member 600 can be used in a printing system as described in WO2016/189512. In the figure, the uppermost layer 602 represents a release layer (i.e. a separate release surface) capable of transiently retaining the (ink) particles until they are selectively softened for release, 604 represents a layer capable of harvesting the radiation to enable the particles softening (e.g., a radiation absorbing layer), 606 represents a conformational layer capable of facilitating contact between the release layer and (ink) particles thereupon and the topography of the surface of the printing substrate during transfer at an impression station, 608 represents a compressible layer capable of facilitating contact between the transfer member and the printing substrate and 610 represents a support layer for all the afore-said layers which can jointly form a desired opaque transfer member 600.

As explained, though illustrated in FIG. 1 as distinct layers, the imaging layer can be formed of a single imaging layer 620 integrating the functions of layer 602 and 604 or the functions of layers 602, 604 and 606, the remaining layers forming the body/support layer 630 of the opaque transfer member 600. Generally, the hardness of the imaging layer 620 and or of its constituting layers, if separate, is relatively low. In some embodiments, each of 602, 604, 606, and 620 may have a hardness of 50 Shore A or less, 40 Shore A or less, 30 Shore A or less and 20 Shore A or less; and of at least 5 shore A.

A release layer 602, when present as a separate layer, can have, in some embodiments, a thickness of 3 µm or less, of 2 µm or less, or between 0.5 µm and 1.5 µm.

A release layer 602 can be made of any material capable of providing sufficient adhesion to native (non-tacky) particles and enough release to particles softened by irradiation to selectively transfer. High release elastomers provide a variety of suitable candidates, including but not limited to liquid silicone resins (LSR), room temperature vulcanization (RTV) silicones, polydialkyl siloxanes (PDAS), including for instance polydimethyl siloxanes (PDMS) silicones, which can be, if needed, further functionalized by desired reactive groups (e.g., amine groups, vinyl groups, silane or silanol groups, alkoxy groups, amide groups, acrylate groups etc., and combinations thereof, as known in the art of silicones) to produce functionalized silicones. As used herein, the term "silicone" is used broadly to include such functionalized silicones, unless explicit or evident to the contrary. While generally encompassed by the term "silicone", such functionalized silicones may also be referred to as "silicone-based" polymers. Some functions can be cross-linkable moieties, while others may provide different desired properties to the elastomer. Additionally, the function of the elastomer is non-reactive and can be based on atoms such as fluor. These elastomers can be classified into addition-curable silicones and condensation-curable silicones, some chemical families enabling both curing methods. Advantageously, in some embodiments, a release layer can additionally reduce or prevent parasitic transfer. The release layer 602, of an opaque transfer member 600, is preferably devoid or substantially devoid of fillers that may interfere with the activity of the CB particles of the radiation absorbing layer 604, over the range of radiation to which a transfer member formed therefrom would be subjected. A similarly "passive" behavior is likewise desirable for a release layer 702 of a transparent transfer member 700. A release layer may, in some embodiments, additionally benefit from non-scattering properties.

Non-limiting examples of addition-curable silicone (ACS) include LSR and addition-curable RTV, PDAS and PDMS silicones, whether or not further functionalized. ACS elastomers are cross-linked to form a matrix in presence of cross-linkers and any such agent (e.g., a platinum catalyst) promoting the bridging of the polymers or on the contrary retarding it (e.g., for practical manufacturing purposes, by way of inhibition of the curing facilitators), any and all such agents being termed herein "addition curing" agent(s). In one embodiment, the ACS is a vinyl-functionalized silicone, which may be cured in presence of at least one addition-curing agent, under any curing conditions suitable for said materials.

Non-limiting examples of condensation-curable silicones (CCS) include condensation-curable RTV, PDAS and PDMS silicones, whether or not further functionalized. CCS elastomers can be cross-linked to form a matrix in absence of additional cross-linkers, such effect being provided by suitable moieties or functional groups on the silicone backbone. In some embodiments, condensation curing may further require a catalyst (e.g., a tin catalyst) and any such agent promoting the condensation of suitable moieties of the polymers, any and all such agents being termed herein "condensation curing" agent(s). In one embodiment, the CCS is a silanol-functionalized silicone, in a particular embodiment a silanol-terminated silicone. The silanol functionalized CCS may be cured in presence of at least one condensation-curing agent, under any curing conditions suitable for said materials. In one embodiment, the CCS is a reactive amino-silicone. Addition curing agents and condensation curing agents respectively suitable for the curing of ACS and CCS elastomers are known and need not be further detailed herein. Likewise, curing conditions for such materials are known to the skilled person and may, if needed, readily be optimized for any particular use by routine experimentation.

Presence of catalysts can be detected by trace analysis of tin (for CCS) or platinum (for ACS) by known analytical methods, e.g., by Inductively Coupled Plasma Spectroscopy (ICP), GCMS, elemental analysis or EDS.

A radiation absorbing layer 604 can have, in some embodiments, a thickness of 25 μm or less, or between 200 nm and 1 μm, or between 500 nm and 2 μm, or between 2 μm and 20 μm, or between 2 μm and 10 μm.

A radiation absorbing layer 604 can be made of a silicone matrix comprising carbon black which is capable of absorbing the radiation emitted by the laser elements of the imaging device or energy from an alternate source (e.g., thermal energy), generating enough heat and/or for a sufficient duration so as to satisfactorily transfer heat to the imaging surface and the particles thereupon. Preferably, the materials forming such layer, and more generally the transfer member, allow the heat generated by the application of energy by the imaging device to dissipate rapidly enough for the heating of the thermoplastic (ink) particles to be time and/or spot specific (e.g., enabling the formation of a desired pixel). Elastomers having a high absorbing ability (as assessed by the absorbance of the material per micron thickness, e.g., >0.1 Abs/μm) in the range of relevance, are considered advantageous from a manufacturing standpoint. However, too high an absorbance should be avoided, as it may result in over-heating of the neighboring layers and/or ink droplets and/or particles. In certain cases, such an over-heating may damage the imaging surface, impairing the release layer, and reducing print quality.

The same silicone resins as described for the release layer (e.g., ACS or CCS silicones, whether or not functionalized) may be used for the preparation of an imaging layer, these silicones being supplemented with carbon black. In one embodiment, a radiation absorbing layer can be made of PDMS loaded with carbon black.

A conformational layer 606 can have, in some embodiments, a thickness between 100 μm and 700 μm, or between 200 μm and 700 μm, or between 300 μm and 700 μm, or between 300 μm and 600 μm, or between 200 μm and 500 μm, or between 100 μm and 150 μm, or between 120 μm and 150 μm, or between 130 μm and 140 μm.

A conformational layer 606 can be made of any suitable elastomer, including for instance the afore-mentioned LSR, RTV, PDAS and PDMS silicones, whether or not further functionalized.

In embodiments where the imaging layer 620 is formed by separate release layer 602, radiation absorbing layer 604 and conformational layer 606, each of the layers is preferably made of an elastomer and composition compatible with the elastomeric composition of the adjacent layer. Layers' compositions are deemed compatible when the materials composing a first layer do not prevent or otherwise affect the formation or function of an adjacent second layer. By way of example, layers prepared either by addition-curing or by condensation-curing are more likely to be compatible with layers prepared by the same curing method. If transfer members are to include a layer prepared by addition-curing and a neighboring layer prepared by condensation-curing, then such layers would be separated by a blocking layer preventing the mutual negative effects of one on the other.

Layer compositions can be further compatible if materials composing a first layer can positively interact with materials composing a second layer, by way of example, if the compositions of the two adjacent layers can promote some cross-linking at their interface facilitating their attachment one to another. This latter aspect of compatibility is however not essential, since distinct layers can be attached one to another by way of suitable adhesives or priming compositions. For transparent transfer members, the adhesive compositions capable of bonding adjacent layers are preferably transparent. In some embodiments, the distinct layers forming the imaging layer are made of silicones of the same chemical family, even if different compounds of the same family are used. For instance, a number of layers can comprise cross-linkable PDAS or PDMS silicones which may however vary in cross-linkable functionalization, number of cross-linkable functional groups or molecular units, molecular weight, hardness and any such parameter generally characterizing such polymers.

In embodiments where the imaging layer is in the form of a single/unique imaging layer 620 combining 602 and 604, such imaging layer 620 can have, in some embodiments, a thickness between 5 μm and 25 μm, or between 5 μm and 20 μm, or between 5 μm and 10 μm. In embodiments where the imaging layer is in the form of a single/unique imaging layer 620 combining 602, 604 and 606, such imaging layer 620 can have, in some embodiments, a thickness between 100 μm and 150 μm, or between 120 μm and 150 μm, or between 130 μm and 150 μm. Such a layer would incorporate the materials suitable for its "constituent" layers in similar amounts or proportions, as described above for some embodiments of the invention.

Reverting to the body/support layer 630 of an opaque transfer member, a compressible layer 608 can have, in some embodiments, a thickness between 300 μm and 400 μm, or between 300 μm and 350 μm, or between 300 μm and 320 μm. The compressibility such layer can provide to the opaque transfer member 600 is typically of at least 50 μm, at least 100 μm, at least 150 μm, or at least 200 μm. The compressibility, in some embodiments, needs not to exceed 250 μm, of the transfer member total thickness.

A compressible layer 608 can be made of any suitable compressible elastomer, such as providing a sponge- or foam-like structure.

A compressible layer provides for at least part of the desired compressibility of a transfer member which improves transfer of tacky particles to the substrate. As mentioned, a compressible layer may improve the contact between the imaging layer and the substrate by adapting the imaging surface to inherent topographical variations of the substrate. In some embodiment, the compressibility of a compressible layer is at least 10% under a load of P=2 bars.

A compressible layer is made of any suitable compressible material or compressible combination of materials, having mechanical and optionally thermal properties suitable for the operability of the transfer member. In some embodiments, a compressible layer comprises (or even consists of) a material selected from the group consisting of room temperature vulcanization RTV and RTV2, liquid silicone LSR, Vinyl Methyl Silicone (VMQ), Phenyl Silicone Rubber (PMQ, PVMQ), fluorosilicone rubber (FMQ, FMVQ), alkyl acrylate copolymer (ACM), ethylene propylene diene monomer (EPDM) rubber, nitrile rubber, void-comprising hydrogenated nitrile butadiene rubber, S-cured and/or peroxide cured rubbers, open-cell rubbers, saturated open-cell rubbers, closed-cell rubbers and combinations thereof. In some embodiments, the rubber is a nitrile rubber having 40-60% (by volume) small voids. In some embodiment, the nitrile rubber is a void-comprising hydrogenated nitrile butadiene rubber (HNBR).

While in some embodiments, the afore-mentioned layers 602, 604, 606, 620 and 608 can be mounted or cast on a rigid support (e.g., a drum), in an alternative embodiment such support can be a flexible one. In such case, illustrated in FIG. 1, a support layer 610 can have, in some embodiments, a thickness between 250 μm and 350 μm, or between 250 μm and 300 μm, or between 250 μm and 270 μm.

In an alternative embodiment, the opaque transfer member can be devoid of a compressible layer. In such case, the compressibility desired at an impression nip can be provided by an element external to the transfer member. By way of example, a transfer member lacking a compressible layer can be used in association with an impression cylinder or any other pressure roller having such a layer as an outer compressible surface.

Examples of Imaging Layers

The imaging layers prepared according to the above principles may be hydrophobic surfaces made of an elastomer comprising silicone polymers cross-linked by addition curing. When combining, in addition to release and conformational properties, radiation absorbing capabilities, the elastomeric composition forming this outer surface of the transfer member include an absorbing material or absorbing filler able to absorb radiation (e.g., radiation from laser beams) and to transfer heat generated thereby to the imaging (release) surface with sufficient efficiency so as to evaporate the liquid carrier of an ink droplet or so as to soften thermoplastic particles positioned thereupon to an extent they are rendered tacky enough to selectively transfer to a printing substrate. The imaging layer, including such a radiation absorbing property is formulated by dispersing carbon black (CB) in compatible silicone-based polymers as detailed herein-below.

As appreciated by a person skilled in the art of elastomer formulation, a "compatible" set of materials for any particular composition or formulation means that the presence of any such compatible compound does not negatively affect the efficacy of any other compound for any step of preparation or in the final composition. Compatibility can be chemical, physical or both. For instance, a dispersant suitable to disperse carbon black into a curable silicone fluid would be compatible both with the carbon black material and with the silicone polymers to be cured (as well as with any other agent required to perfect such curing; all collectively generally termed the "silicone media"). While in the description provided below, several dispersing methods are disclosed, these are not meant to be limiting. Suitable equipment may include an ultrasonic disperser, a sand mill, an attritor media grinding mill, a pearl mill, a super mill, a ball mill, an impeller, a dispenser, an horizontal agitator KD mill, a colloid mill, a dynatron, a three-roll mill and a press kneader, to name a few.

Carbon Black

It is believed that a variety of carbon black (CB) materials may be suitable, among other functions, as an absorbing material for an imaging layer according to the present teachings. The Applicant believes that the present teachings surprisingly enable the dispersion of hydrophilic CB particles in hydrophobic elastomeric compositions. Hydrophilic CBs, which can readily disperse by means of gentle shaking by hand in water at concentrations of at least 5 wt. %, can be characterized by their oxygen content, resulting from the oxidizing treatment used for their manufacturing, which is deemed to correlate with the content of volatile compounds.

By selecting or adjusting the content of oxygen atoms on the surface of the carbon atoms to amount within a range of 1 to 40 atomic percent or 5 to 20 atomic percent, and/or by selecting or adjusting the content of volatile components in the carbon black to constitute from about 1.5% to 50% or 10% to 25% by weight of the powder, the dispersibility of the CB and/or the stability of the dispersion may be appreciably improved. A stably dispersed CB may facilitate the preparation of an imaging surface or an absorbing layer so as to obtain a substantially uniform absorbing capacity over the entire surface thereof, even if absorbance may occur in fact underneath the outermost surface and nominal absorbance varies along the depth/thickness of the transfer member. An even behavior of the transfer member (e.g., to absorb radiation, to absorb thermal energy, to transfer heat, etc.) is desirable to achieve quality printing. That is, the transfer member has consistent properties across its width and length (wherein the width and length are the dimensions exposed to the ink or the particles and the depth is the dimension through the layers of the transfer member).

While the CB particles can be evenly distributed along the layer cross-section, in some embodiments a non-uniform distribution may be preferred. Such a non-uniform distribution may, for example, have a peak (representing a relatively higher density of particles) close to the imaging surface so that strong absorption may occur close to the imaging surface.

The term "atomic %" for the surface oxygen relates to the ratio of the number of oxygen atoms (O) to the number of carbon atoms (C): (O/C)×100% existing on a surface of the carbon black particles (including at any detectable depth in an interior portion of the particle). Generally, such values are provided by the CB manufacturers, but can be independently determined by known methods such as X-ray photoelectron spectroscopy (XPS), Fourier transform infrared spectroscopy (FTIR), organic elemental analysis, or electron spectroscopy for chemical analysis (ESCA). The CB manufacturers may alternatively or additionally, provide information regarding the oxygen content values, which can be converted to atomic percent for surface oxygen by multiplying by a factor of 0.75.

A CB material can be oxidatively-treated to increase the atomic % of oxygen on its surface. Examples of suitable oxidizing agents, whether gaseous or liquid, include ozone, hydrogen peroxide, nitric acids, and hypochlorous acids. The carbon black can be oxidized, for instance, with ozone or an ozone-containing gas at ambient temperature. There are also methods of wet oxidation in which the carbon black is exposed to a hypohalous acid salt, including, for instance, sodium hypochlorite and potassium hypochlorite.

By way of example, a typical preparation involves mixing the carbon black powder with hypohalous acids or salts thereof, preferably in an aqueous medium, and stirring the mixture for 1-24 hours at a temperature of room temperature to about 90° C., elevated temperatures of 50° C. or more being advantageous. The powder is then separated from the slurry, washed to remove unreacted oxidizing agent and allowed to dry. The degree of oxidation may be controlled by adjusting the concentration of the oxidizing agent, the ratio of the carbon black particles to the oxidizing agent, the oxidation temperature, the oxidation time, the stirring speed, and the like. The amount of oxygen on the CB surface (whether oxidatively-treated or not) is preferably 5 atomic % or more, 7.5 atomic % or more, or 10 atomic % or more, from the viewpoint of dispersion suitability.

In some embodiments, the oxygen content of the carbon black particles is at least 1 wt. %, at least 1.5 wt. %, at least 2 wt. %, at least 3 wt. %, at least 4 wt. %, at least 5 wt. %, at least 6 wt. %, at least 7 wt. %, at least 8 wt. %, at least 10 wt. %, at least 12 wt. %, at least 15 wt. %, or at least 20 wt. %, by weight of the carbon black particles.

In some embodiments, the oxygen content of the carbon black particles is at most 40 wt. %, at most 30 wt. %, at most 25 wt. %, at most 22 wt. %, at most 20 wt. %, at most 18 wt. %, at most 15 wt. %, or at most 13 wt. %, by weight of the carbon black particles.

In some embodiments, the oxygen content of the carbon black particles is within a range of 1.0 w.% to 40 wt. %, 2 wt. % to 35 wt. %, 3 wt. % to 35 wt. %, 4 wt. % to 30 wt. %, 4 wt. % to 25 wt. %, 5 wt. % to 25 wt. %, 5 wt. % to 20 wt. %, 6 wt. % to 20 wt. %, 6 wt. % to 18 wt. %, 7 wt. % to 15 wt. %, 8 wt. % to 13 wt. %, or 10 wt. % to 13 wt. %, by weight of the carbon black particles.

Examples of a carbon black having an amount of oxygen of less than 5 atomic %, which may therefore benefit from being oxidatively-treated to be rendered suitable, include carbon black manufactured by a known method such as the contact method, furnace method, or thermal method.

Specific examples of such low surface oxygen CB include Raven® 5750, Raven® 5250, Raven® 2000, Raven® 1500, Raven® 1250, Raven® 1200, Raven® 1190 ULTRAII, Raven® 1170, Raven® 1255, Raven® 1080, Raven® 1060, and Raven® 700 (all manufactured by Columbian Chemicals Company), Regal® 400R, Regal® 330R, Regal® 660R, Mogul® L, Black Pearls® L, Monarch® 700, Monarch® 800, Monarch® 880, Monarch® 900, Monarch® 1000, Monarch® 1100, Monarch® 1300, and Monarch® 1400 (all manufactured by Cabot Corporation), Color Black FW1 (pH 3.5, BET surface area 320 $m^2/g$), Color Black 18, Color Black S150, Color Black S160, Color Black S170, Printex® 35, Printex® U, Printex® V, Printex® 140U, Printex® 140V, NIPex® 180-IQ, NIPex® 170-IQ (all manufactured by Evonik Degussa Corporation), No. 25, No. 33, No. 40, No. 45, No. 47, No. 52, No. 900, No. 2200B, No. 2300, No. 990, No. 980, No. 970, No. 960, No. 950, No. 850, MCF-88, MA600, MA 7, MA 8, and MA 100 (all manufactured by Mitsubishi Chemical Corporation).

The carbon black having an amount of surface oxygen of 5 atomic % or more may be, in addition to being prepared by oxidative treatment as mentioned, a commercially available product. Specific examples thereof include Color Black FW2 (amount of volatile material 16.5 wt. %, OAN 155 cc/100 g, pH 2.5, BET 350 $m^2/g$, PPS 13 nm), Colour Black FW 182 (amount of surface oxygen: 12 atomic %, amount of volatile material 20 wt. %, OAN 142 cc/100 g, pH 2.5, BET 550 $m^2/g$, PPS 15 nm), Colour Black FW 200 (amount of surface oxygen: 12 atomic %, amount of volatile material 20 wt. %, OAN 160 cc/100 g, pH 2.5, BET 550 $m^2/g$, PPS 13 nm), NIPex® 150 (amount of volatile material 10 wt. %, OAN 120 cc/100 g, pH 4.0, BET 175 $m^2/g$, PPS 25 nm), Special Black 4 or 4A (amount of volatile material 14 wt. %, OAN 100-115 cc/100 g, pH 3.0, BET 180 $m^2/g$, PPS 25 nm), Special Black 5 (amount of volatile material 15 wt. %, OAN 130 cc/100 g, pH 2.5, BET 240 $m^2/g$, PPS 20 nm), Special Black 6 (amount of surface oxygen: 11 atomic %, amount of volatile material 18 wt. %, OAN 170 cc/100 g, pH 2.5, BET 300 $m^2/g$, PPS 17 nm), all foregoing available from Orion Engineered Carbons Co., Ltd; Raven® 5000 Ultra II or Ultra III (amount of volatile material 10.5 wt. %, OAN 95 cc/100 g, pH 3.0-3.5, BET 583 $m^2/g$, PPS 8 nm; manufactured by Columbian Chemicals Company), and Fuji Jet Black (amount of surface oxygen: 12 atomic %; manufactured by Fuji Pigment Co., Ltd.). Information regarding different properties of these exemplary Carbon Blacks was provided by their respective manufacturers.

Additional CB particles that may be used in the method of the present invention include Black Pearls® 800, Black Pearls® 880, Black Pearls® 2000, Black Pearls® 4350, Black Pearls® 4750, Monarch® 460, Monarch® 480, Monarch® 570, Monarch® 580, Elftex® 415, Elftex® 430, Elftex® 460, Elftex® 570, Elftex® OP, Elftex® Vulcan P, Regal® 99R and Regal® 500R (all manufactured by Cabot Corporation), Raven® 890, Raven® 890H, Raven® 1000, Raven® 1020, Raven® 1035, Raven® 1040, Raven® 1255, Raven® 3500 and Raven® 7000 (all manufactured by Columbian Chemicals Company), NIPex® 160-IQ, NIPex® 35, NIPex® 70, NIPex® 90, Printex® 60-A, XPB 229 and XPB 255 (all manufactured by Orion Engineered Carbons Co.).

The level of oxidation of the CB material can be estimated by Raman spectroscopy (e.g., using LabRAM HR Evolution, Horiba Scientific). This technique allows determining the D-band and G-band peaks of the compound under study for predetermined excitation laser wavelengths (e.g., in the range of 488 nm to 647 nm), laser powers (e.g., 40 mW) and integration times (e.g., of 10 s to 120 s). Temperature can be controlled to reduce black noise (e.g., by cooling the detector). The Raman peak intensity maxima (I) can be obtained, with or without deconvolution of the spectrum by an integrated software further allowing baseline correction, if needed. It is then possible to compute the Raman peak intensity ratio of the D-band and G-band, respectively $I_D$ and $I_G$. The maximal intensity of each peak is typically measured on the undeconvoluted spectra. The spectral behavior and resulting band ratio ($I_D/I_G$) can be empirically correlated with the level of oxidation of the elemental carbon materials. A relatively low D-band to G-band ratio indicates that the CB is less oxidized than a CB having a relatively higher D-Band to G-Band ratio, all other structural properties of the CB being similar. By way of example, an $I_D/I_G$ ratio of 0.8 or more, 1.0 or more, 1.2 or more, indicates that the CB material is relatively oxidized as desired in some embodiments of the invention. Such Raman spectra can be unaffected in the bands of interest by some elastomer matrices (notably PDMS), so that the method advantageously provides a non-destructive technique to assess CB characteristics within a cured composition. Such an analysis was performed on a sample of Colour Black FW 182 (having a volatile matter content of ~20 wt. %) and the $I_D/I_G$ ratio of the CB material was found to be 0.99. For comparison, a less oxidized sample (Mogul® L having a volatile content of ~4.5%) displayed a lower $I_D/I_G$ ratio of 0.75.

In some embodiments, the volatile matter content of the carbon black, as may be determined according to DIN 53552 or by other means known to those of skill in the art, is at least 1.5 wt. %, at least 2.5 wt. %, at least 3.5 wt. %, at least 5 wt. %, at least 7 wt. %, at least 8 wt. %, at least 10 wt. %, at least 12 wt. %, at least 15 wt. %, at least 18 wt. %, or at least 20 wt. %, by weight of the carbon black particles.

In some embodiments, the volatile matter content is at most 50 wt. %, at most 40 wt. %, at most 35 wt. %, at most 30 wt. %, at most 27 wt. %, at most 25 wt. %, or at most 22 wt. %, by weight of the carbon black particles.

In some embodiments, the volatile matter content of the carbon black particles is within a range of 1.5 wt. % to 50 wt. %, 2.5 wt. to 50 wt. %, 3.5 wt. % to 40 wt. %, 5 wt. % to 40 wt. %, 5 wt. % to 30 wt. %, 5 wt. % to 25 wt. %, 7 wt. % to 30 wt. %, 10 wt. % to 30 wt. %, 10 wt. % to 25 wt. %, or 15 wt. % to 22 wt. %, by weight of the carbon black particles.

Another way of characterizing carbon black suitable for the preparation of imaging layers for transfer members according to the present invention, is by its surface zeta potential. The zeta potential is a measure of the magnitude of the electrostatic or charge repulsion/attraction between particles. Zeta potential values provide insight into the CB's ability to disperse, aggregate or flocculate.

In some embodiments, the CB has a surface zeta potential of at most −15 mV, at most −20 mV, or at most −25 mV, and more typically, of at most −30 mV, at most −35 mV, at most −40 mV, or at most −45 mV.

In some embodiments, the surface zeta potential of the CB is within a range of −70 mV to −15 mV, −70 mV to −20 mV, −70 mV to −25 mV, −70 mV to −30 mV, −70 mV to −35 mV, −70 mV to −40 mV, −70 MV to −45 mV, −60 mV to −20 mV, −60 mV to −30 mV, −60 mV to −35 mV, −55 mV to −30 mV, −50 mV to −25 mV, −50 mV to −30 mV, or −50 mV to −35 mV.

In some embodiments, the surface zeta potential can be measured at a pH of at least 8.0, said measurement being optionally performed at a pH of 12.0. Conveniently, the measurement of the zeta potential of a material or of a composition can be performed at low concentration of the material in an appropriate carrier or on a diluted form of the composition. For instance, a test sample may comprise 2 wt % or less of solid material or composition ingredients, 1 wt. % or less, or 0.1 wt % or less.

The content of the CB particles in the imaging layer may advantageously be sufficient to achieve the desired radiation absorption, heat transfer, selective tackiness of the particles, which effects may in turn depend on a variety of operating conditions of a printing system in which such transfer member would be used. Typically, the carbon black is present in the imaging layer or in the radiation absorbing layer of the imaging layer at a concentration between 0.5% and 20% by weight of the cured layer, or from 1 wt. % to 15 wt. %, or from 2 wt. % to 10 wt. %, or from 1 wt. % to 7.5 wt. %, or from 5 wt. % to 20 wt. %, or from 10 wt. % to 20 wt. %, or from 15 wt. % to 20 wt. %. Or for example at a concentration of 0.1 to 30% w/w. For uses other than the preparation of transfer members for printing systems, the desired amount of CB in the elastomer matrix may vary according to the desired effect. By way of example concentrations as low as 0.01 wt. % to 3 wt. % or even in the range of 0.05 wt. % to 1.5 wt. % may suffice to confer electrical conduction to the matrix, assuming the bulk CB material is suitable to provide such an electrical conduction.

The pH of an aqueous dispersion of a CB suitable for the present invention, as determined at 25° C., can preferably be in an acidic to around neutral range, for instance from pH 2.0 to pH 8.5, from pH 2.5 to pH 7.5, and advantageously, in a relatively acidic range from pH 2.0 to pH 5.5, or from pH 2.0 to pH 4.5, or from pH 2.5 to pH 4.0, or from pH 2.0 to pH 3.5. The pH of a CB dispersion of pre-determined concentration can be measured with any suitably calibrated pH-meter equipment, for instance, according to ISO 787-9. Briefly, a 4 wt. % CB dispersion (in 1:1 distilled water:methanol) can be stirred for 5 minutes with a magnetic stirrer at about 600-1,000 rpm, whilst the pre-calibrated pH electrode is immersed in the tested dispersion. The reading of the pH value is taken one minute after switching off the stirrer.

A dibutyl phthalate (DBP) absorption value of the CB material is not particularly limited, but is typically from about 50 mL/100 g to about 200 mL/100 g, or from 100 mL/100 g to 200 mL/100 g, or from 150 mL/100 g to 200 mL/100 g. Generally, such DBP values, or similar Oil Absorption Numbers (OAN), are provided by the CB manufacturers, but can be independently determined by known methods such as according to JIS K6621 A method or ASTM D 2414-65T.

Carbon black particles can be further characterized by specific surface area measurements, the most prevalent methods including cetyltrimethylammonium bromide adsorption (CTAB), iodine adsorption and nitrogen adsorption. The CTAB method is described in ASTM D 3765. The iodine method is described in ASTM D 1510, and results in the assignment of an iodine number.

A specific surface area of the CB material is not particularly limited, but when determined by BET nitrogen absorption techniques, is preferably from 50 $m^2$/g to 650 $m^2$/g, or from 100 $m^2$/g to 550 $m^2$/g. Generally, such BET values are provided by the CB manufacturers, but can be independently determined by known methods such as according to ASTM D3037.

The substantially even dispersion/uniform absorbing capability described herein-above, can be facilitated by using CB in the formed layer having an average particle size of less than one micrometer. Such dimensions are preferred not only with respect to primary particle size (PPS), but also for secondary particle size (SPS) also known as clusters, which may result from agglomeration of such primary particles. Particles, both primary and secondary, having an average particle size of less than half the wavelength of the emitted beam are further preferred, as scattering is accordingly reduced. Preferably the clusters (secondary particles) have a predominant measured cluster size (Dv90) of less than half the wavelength of the emitted beam. That is, at least 90% have a measured dimension of less than half of the wavelength of the emitted beam being employed in the printing method. Hence, CB particles having an average particle size of less than 500 nanometers, less than 400 nm, less than 300 nm or less than 200 nm are favored. CB particles having an average size, typically a primary particle size (PPS), of 100 nm or less are deemed in the nano-range, primary particles having an average size of 80 nm or less, 60 nm or less, 40 nm or less, or 30 nm or less, being particularly preferred for close particle packing. Generally, the CB particles have an average PPS of 5 nm or more, or 10 nm or more, or 15 nm or more. The size of the particles, predominantly of the primary particles, may affect their ability to closely pack within the elastomer, relatively small particles being capable of higher packing density than their relatively larger counterparts. Advantageously, a lower amount of relatively small particles may achieve a similar CB density as a higher amount of relatively large particles. Depending on their size, and additionally among other things on the viscosity of the elastomer, the conditions and duration of curing, the thickness of the layer being cured and such manufacturing factors known to the skilled person, the particles may segregate and form a gradient-like distribution across the layer thickness. Larger CB secondary particles may tend to more rapidly migrate and accumulate towards the bottom of the layer, while relatively smaller particles may follow such a trend, if at all, at a slower pace, hence remaining in relatively higher concentration in the upper section of the layer. In this context, "bottom" and "top" sections of the layer relate to their orientation during curing, and not necessarily when installed and in operation in a printing system. Such a segregation of the particles forming inner strata of particle distribution along the depth of the imaging surface may be advantageous if a sufficient thickness of the upper section becomes substantially devoid of CB particles. This "top stratum" can serve as a release layer, the absence of particles increasing its smoothness. In some cases, a relatively high smoothness of the releasing surface of the imaging layer can be desirable. Smooth surfaces generally display an arithmetical mean deviation $R_a$ of less than 1 micrometer. In some embodiments, the surface roughness $R_a$ of the imaging surface is less than 0.5 µm, or less than 0.2 µm, or less than 0.1 µm.

Manufacturers generally provide the average primary particle size of the CB material, as assessed for instance according to ASTM D 3849. Particle size distribution, whether assessed by DLS or microscopic techniques, may provide information on the primary particle size (PPS) of the material and on its secondary particle size (SPS), i.e. the size of assembly of primary particles forming for instance clusters or agglomerates.

The CB particles may have any suitable aspect ratio, i.e., a dimensionless ratio between the smallest dimension of the particle and the longest dimension in the largest plane orthogonal to the smallest dimension. In some embodiments, the carbon black primary particles are approximately spherical and can have an aspect ratio in the range of 0.2:1 to 1:5, or 0.5:1 to 1:2. Secondary particles of CB which may agglomerate therefrom are not necessarily spherical, still their aspect ratio can be in the range of 0.1:1 to 1:10, 0.2:1 to 1:5, or 0.5:1 to 1:2.

Though not essential, the carbon black primary particles may preferably be uniformly shaped and/or within a symmetrical distribution relative to a median value of the population. In some embodiments, the carbon black secondary particles are within a relatively narrow particle size distribution, such narrow PSD being advantageously maintained in the cured silicone elastomer.

A support layer 610 for an opaque body typically includes an elastomer reinforced by any suitable solid reinforcement material, such as particles or fibers which can act as mechanical fillers, or a fabric impregnated with such an elastomer. Solid reinforcement materials generally are in an amount not exceeding 10% by weight of such support layer. Fibers are generally in the range of about 50 to about 200 µm, while particles typically do not exceed 10 µm in average size. Though the reinforcement material may consist of, or consist essentially of, one type of solid mechanical filler, in some embodiments the body may comprise both reinforcement particles and fibers in any desired proportion.

In some embodiments, the fibers comprise a material selected from the group consisting of organic fibers, meta-aramid, para-aramid, polyamide, nylon fibers, polyester fibers, high density polyethylene fibers, natural fibers, cotton fibers, inorganic fibers, glass fibers, carbon-based fibers, ceramic fibers, metal fibers and combinations thereof.

In some embodiments, the fibers are surface-treated fibers, which surface treatment increases adhesion of the fibers. When the elastomer embedding the fibers is of silicone, vinyl silanes may, for instance, be suitable to surface-treat the fibers. When the elastomer embedding the fibers is other than a silicone polymer, for instance of polyurethane, then isothiocyanate silane or polyol silane can be suitable to surface-treat the fibers. Such examples are not limiting, materials suitable to treat fibers being known and in no need of being further detailed herein.

In some embodiments, the fibers constitute a fabric. In some embodiments, the fabric has a thickness of not less than 50 micrometers and not more than 200 micrometers. In some embodiments, the fabric is 1-ply or at least 1-ply, in some at least 2-ply, in some at least 3-ply, and in some embodiments at least 4-ply.

In some embodiments, fabrics made of thin fibers (e.g., of up to 1 mm thickness, or of up to 0.8 mm thickness, or of up to 0.6 mm thickness, or of up to 0.4 mm thickness, or even of up to 0.2 mm thickness) and having a relative high yarn density are desirable for obtaining a particularly smooth finished surface. The yarn density can be expressed by the number of threads in the warp and weft direction of the fabric per unit length. The number of threads in any given direction can be as low as about 10 per cm and as high as about 20 or even 30 per cm. The number of threads in each directions may be equal (e.g., 10*10) or may not be equal (e.g., 9*8, 12*10, 16*15, 17*12, 19*13, 19*12, or 19*10).

In some embodiments, the fabric is a non-woven fabric. In some embodiments, the fabric is a woven fabric.

In some embodiments, the fibers are oriented fibers. In some embodiments, the fibers are uni-directionally oriented, typically in parallel to the direction of movement of the transfer member to reduce stretching. This direction may also be termed the printing direction. In some embodiments, the fibers are bi-directionally oriented, typically some oriented in parallel (0°) and some perpendicularly (90°) to the printing direction. In some embodiments, the fibers are three-directionally oriented, typically some oriented in parallel (0°), some perpendicularly (90°) and some either at 45° or −45° to the printing direction. In some embodiments, the fibers are four-directionally oriented, typically some oriented in parallel (0°), some perpendicularly (90°), some at 45° and some at −45° to the printing direction.

In some embodiments, the fibers may be attached one to another to form an unwoven or woven fabric ply. Fibers may be woven by any suitable weaving method of interlacing warp) (0°) and weft (90°) fibers. Standard patterns include plain weave (wherein each warp fiber passes alternately under and over each weft fiber); basket weave (wherein two or more warp fibers alternately interlace with two or more weft fibers); and twill weave (wherein one or more warp fibers alternately weave over and under two or more weft fibers in a regular repeated manner), including satin weave, for which the number of fibers crossed and passed under is typically above four. Plain weave advantageously permits high yarn density and smooth finished surfaces.

Depending on any of the above-mentioned parameters, a fabric may be further characterized by its weight per surface, typically expressed in grams per square meter. Fabrics having a weight per unit area between about 180 g/m² and about 1000 g/m² can be suitable for the formation of an opaque body.

Elastomers suitable to embed such solid reinforcement materials or optionally impregnate them if in the form of a fabric can be selected from the group consisting of room temperature vulcanization RTV and RTV2 silicones, liquid silicone rubber LSR, Vinyl Methyl Silicone (VMQ), Phenyl Silicone Rubber (PMQ, PVMQ), fluorosilicone rubber (FMQ, FMVQ), alkyl acrylate copolymer rubbers (ACM), ethylene propylene diene monomer rubber (EPDM), fluoroelastomer polymers (FKM), nitrile butadiene rubber (NBR), ethylene acrylic elastomer (EAM), and hydrogenated nitrile butadiene rubber (HNBR).

The elastomer elected for the support layer may additionally provide desired friction property, depending on the use to be made of the transfer member in any particular printing system. By way of example, high friction properties can be desired if the transfer member is to be mounted on a drum, while low friction properties can be preferred were the transfer member to slide on static elements. High friction properties can be provided, for example, by silicone rubbers, while FKM rubbers generally yield low friction surfaces.

As mentioned, an adhesive layer (not shown in FIG. 1), can be used to attach the layers of the transfer member. Such layers have a thickness which may depend on the roughness of the recipient layer, for relatively smooth recipient body, the adhesive layer can have a thickness typically not exceeding 10 µm. Any suitable adhesive can be used, its composition being compatible with the layers to be attached thereby. Furthermore, the adhesive layer, as any other layers of the transfer member, is preferably adapted to the working conditions to which the transfer member is subjected in operation of the printing system.

An adhesive layer can be made of silicones, polyurethanes, and such known flexible elastomeric adhesive materials. Such examples are not limiting, materials suitable to adhere elastomers one to another being known and in no need of being further detailed herein.

Alternatively, a priming layer can be used, the composition of which depends on the layers to be bound. Such layers typically have a thickness of 1 µm or less. Suitable materials include silanes, titanates and other such sizing agents.

In some embodiments, adhesive layers or priming layers are not necessary, the attachment of one layer to another being achieved by co-curing of the two layers, at least one of which would have been previously partially cured.

An opaque transfer member 600 formed by combinations of afore-described layers, including a flexible support layer, can have, in some embodiments, a thickness between 0.5 mm and 2 mm, 0.5 mm and 1.5 mm, 0.5 mm and 1 mm, 650 µm and 900 µm, or between 620 µm and 800 µm, or between 630 µm and 640 µm. If mounted on a rigid support, such ranges may be reduced by at least about 250 µm.

For any of the previously described layers 604 to 630 of an opaque transfer member 600, the penetration of the laser beam energy through the layers is less of a concern as long as the relevant range of wavelengths can sufficiently pass the release layer 602 to front-side "activate" the radiation absorbing layer 604, allowing enough heat to travel back toward the imaging surface so as to soften the (ink) particles rendering them sufficiently tacky for transfer, when desired. Therefore, while all said layers can be transparent as far as radiation progression is concerned, they are typically opaque, as customary for conventional printing blankets known in the art.

An exemplary opaque transfer member 600 was prepared as follows. An imaging layer comprising 5 wt. % CB dispersed in PDMS with an amino silicone dispersant was prepared as previously described according to the first exemplary procedure. A series of layers of about 5 µm to about 20 µm were applied with a wire rod to an opaque body consisting of a 200 µm conformational layer, a 350 µm compressible layer and a 300 µm fabric-reinforced support layer. These exemplary transfer members were used in a printing system according to one embodiment of the present invention. In an alternative experiment, the imaging surface was separately prepared on PET, inversed and adhered through the surface previously facing air to a body consisting of the same afore-mentioned layers.

Transparent Transfer Member

Figure 2:
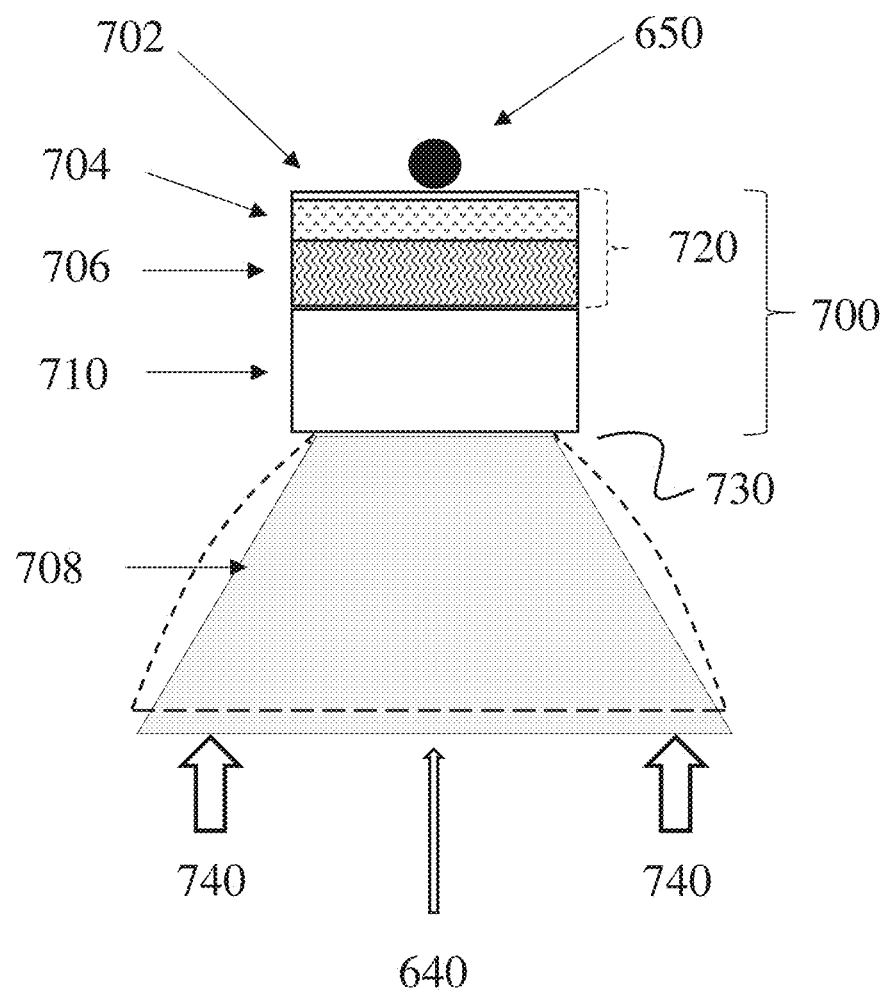
FIG. 2 is a schematic representation of a "transparent" transfer member according to particular embodiments of the invention.

A transparent transfer member is schematically illustrated in FIG. 2 by way of an exemplary cross-section through its layers. For convenience, a source of irradiation 640 and a single particle 650, which for clarity are not drawn to scale, are shown to illustrate how transfer member 700 can be used in a printing system according to some embodiments of the invention. In the figure, 702 represents a release surface in the form of a release layer capable of transiently retaining the (ink) particles until they are selectively softened for release, which needs not be transparent as the layers to be below described and can in principle be similar to previously discussed 602. 704 represents a layer capable of harvesting the radiation to enable the particles softening (e.g., a radiation absorbing layer) and 706 represents a transparent conformational layer capable of facilitating contact between the release layer and particles thereupon and the topography of the surface of the printing substrate during transfer at an impression station. As explained, though illustrated in FIG. 2 as distinct layers, the imaging layer can be formed of a single/unique imaging layer 720 integrating the functions of 702 and 704 or the functions of 702, 704 and 706, the remaining layer 710 representing a support layer for all the afore-said layers which can jointly form a desired transparent transfer member 700.

As for an opaque transfer member, the hardness of the imaging layer 720 of a transparent transfer member 700, or of the layers forming the imaging surface, if separate, can be relatively low. In some embodiments, each of 702, 704, 706, and 720 may have a hardness of 50 Shore A or less, 40 Shore A or less, 30 Shore A or less and 20 Shore A or less and of at least 5 shore A.

In contrast with the previously described layers 604 to 630 of an opaque transfer member, for which laser beam progression through the layers is less of a concern, layers 704, 706 and 710 of a transparent transfer member 700 need to allow sufficient penetration of the relevant range of wavelengths to "activate" the radiation absorbing layer 704 from the rear side of the transfer member, allowing enough heat to travel forward toward the imaging surface so as to soften the particles rendering them sufficiently tacky for transfer, when desired.

While a transparent transfer member can hypothetically include a transparent compressibility layer, materials known for their high compressibility (e.g., having a relatively porous structure) are generally opaque and would hamper sufficient progression of radiation across member thickness (hence operability of the imaging surface). Replacing such materials by transparent ones generally affects the relative compressibility of the layer, thus imposing thicker compressibility layers to obtain overall similar compressibility of the transfer member. In other words, by way of example, while an opaque compressible layer of porous structure may have a thickness of 300 µm able to compress down to 100 µm under the pressure conditions applicable at the impression station, a transparent compressible layer may require a thickness of 4 mm to enable similar compressibility of about 200 µm, assuming the transparent elastomer has approximately 5% compressibility under same conditions. Such prospective thicknesses of a transparent compressible layer may be significantly higher than all other layers combined, so that the inclusion of such a transparent compressible layer can be tolerated only if the transparent transfer member is mounted or casted on a transparent rigid support (e.g., a transparent drum or a transparent bar). However, it is believed that such thick compressible layers may negatively affect the flexibility of a transparent member based on a transparent flexible support.

Thus, when considering flexible transfer members, a second difference between an opaque and a transparent transfer member, besides transparency, is the absence of a compressibility layer in the latter. In this embodiment, the compressibility function is now "external" to the transfer member, such property being provided in printing systems relying on a transparent transfer member 700 by a compressible element 708, as illustrated in FIG. 2. In use in a printing system, a transparent lubricant 730 is typically used in the gap formed between the rear side of the support layer 710 and the compressible element 708. Arrows 740 illustrate how pressure forces (e.g., as applied at an impression station in a direction opposite to the arrows) may affect the shape of the compressible element 708, as schematically shown by the dotted contour. While not shown, the compressible element has a rigid backing to ensure a substantially constant distance if kept between the radiation source and the outer surface of the impression cylinder when engaged with the transfer member during impression. A release layer 702 can have, in some embodiments, a thickness of no more than 3 μm, generally between 1 μm and 2 μm.

A release layer 702 can be made of the same ACS or CCS elastomers previously detailed for the opaque transfer member. In one embodiment, a release layer 702 is made of cross-linkable PDAS and PDMS silicones, the silicone backbone bearing any moiety suitable for the desired curing method. In some embodiments, such silicones are fluorinated to any suitable extent. However, fluorinated silicones are less preferred, since they display compatibility problems with silicone polymers of other chemical families. As for the opaque release layer 602, the release layer 702 of the transparent transfer member is preferably devoid of fillers that may negatively affect the activity of the CB particles of the radiation absorbing layer 704.

A radiation absorbing layer 704 can have, in some embodiments, a thickness of no more than 25 μm, generally between 15 μm and 20 μm.

A radiation absorbing layer 704 can be made of the same ACS or CCS elastomers previously detailed for the opaque transfer member. In one embodiment, a release layer 702 is made of cross-linkable PDAS and PDMS silicones, the silicone backbone bearing any moiety suitable for the desired curing method.

A transparent conformational layer 706 can have, in some embodiments, a thickness of no more than 150 μm, generally between 100 μm and 120 μm.

A transparent conformational layer 706 can be made of transparent ACS or CCS curable silicones or of polyurethanes. As already discussed for release layers 602 and 702, the materials suitable for the preparation of transparent layers are preferably devoid of fillers that may reduce or prevent the absorption of the energy by the radiation absorbing layer at the operating wavelengths of the imaging device/printing system. Stated differently, the transparent conformational layer should have a refractive index identical or similar (e.g., within ±5% or even ±0.5%) to the RI of the matrix of the radiation absorbing layer (without its CB contents).

In embodiments where the imaging layer is in the form of a single/unique imaging layer 720 combining 702 and 704, such imaging layer 720 can have, in some embodiments, a thickness of no more than 15 μm, generally between 1 μm and 10 μm, or between 2 μm and 5 μm. Such a layer would incorporate the materials suitable for its "constituent" layers in similar amounts or proportions, as described herein for some embodiments of the invention, materials blended for the sake of release functionality will preferably be transparent. In embodiments where the imaging layer further comprises layer 706 in the single/unique imaging layer 720, such imaging layer 720 can have, in some embodiments, a thickness of no more than 100 μm.

A transparent support layer 710 can have, in some embodiments, a thickness between 400 μm and 600 μm, or 450 μm and 550 μm, or between 480 μm and 520 μm.

A transparent support layer 710 can be made of PET, thermoplastic polyurethanes (TPU), silicones or any other suitable material, such materials being preferably devoid of any filler able to interfere with the desired operability of the radiation absorbing layer.

A transparent transfer member 700 formed by combinations of afore-described layers can have, in some embodiments, a thickness between 500 μm and 1000 μm, or between 500 μm and 900 μm, or between 600 μm and 800 μm.

Though a compressible element 708 can, in some embodiments, be external to the transparent transfer member, the compressibility it should provide when combined in operation with the transfer member 700 is typically of at least 50 μm, at least 100 μm, at least 150 μm, or at least 200 μm. The compressibility, in some embodiments, needs not to exceed 500 μm, and is generally no greater than 400 μm or 300 μm.

A compressible element 708 can be made of silicones or polyurethanes. In some embodiments, such materials are selected to provide a similar RI as the transfer member, even if physically separated therefrom, so as to maintain a substantially uniform RI along the optical path travelled by the laser beams.

The Substrate

The transfer member is not restricted to use with any particular type of substrate. The substrate may be individual sheets of paper or card or it may have the form of a continuous web. Because of the manner in which a thin film of softened polymeric particles is applied to the substrate, the film tends to reside on the surface of the substrate. This allows printing of high quality to be achieved on paper of indifferent quality. Furthermore, the material of the substrate need not be fibrous and may instead be any type of surface, for example a plastics film or a rigid board.

EXAMPLES

First Exemplary Procedure
Grinding Step

A silicone dispersant having good heat stability and compatibility with dimethyl silicone fluids was poured into a spinning tree-roll mill grinding machine (Model JRS230, manufactured by Changzhou Longxin Machinery Co. Ltd.), and operated for up to about one hour, at room temperature (circa 23° C.). The speed was adapted to the viscosity of the paste as the milling process proceeds, such that the speed was decreased with the addition of CB in the range 100-800 rpm. One such dispersant was a functional pendant amine/dimethyl silicone copolymer having an amine number of 8 and a kinematic viscosity at 25° C. of about 3700 mm$^2$/s (GP-342, Genesee Polymers Corporation) which was added in an amount of 375 grams (g) so as to constitute 37.5% by weight of the total composition (wt. %). Carbon Black nano-powder (Colour Black FW 182, Orion Engineered Carbons, CAS No. 1333-86-4, 20 wt. % volatile matter, pH 2.5, 550 m$^2$/g BET Surface, PPS 15 nm) was dried for at least two hours at 120° C. 250 g of the dried CB powder were slowly added to the silicone fluid, such amount of CB constituting 25 wt. % of the final composition. It is to be noted that while the CB material is defined as being in the nano-range due to its primary particle size of about 15 nm, the powder initially mixed with the dispersant mainly consisted of larger agglomerates, aggregates or chunks of CB having size of above 5 μm or even greater than 10 μm, as estimated by microscope techniques. The CB-dispersant mixture was milled until the CB powder was sufficiently size-reduced to be homogeneously dispersed in the silicone fluid and a black, high viscosity mass was obtained. Such size reduction (as well as any other step of the process) was performed under a controlled temperature environment at a temperature suitable to the most heat-sensitive of the materials employed. In the present case, amino silicones set such threshold of heat-sensitivity, losing their activity at temperatures of about 70° C. or more. Hence the size-reduction step involving the amino silicone dispersant was performed under controlled temperature of about 50° C. The CB primary particles formed agglomerates and the average size (e.g., diameter) of such CB secondary particles following this step was of about 200-400 nanometers, as estimated by image analysis of the cured layer later obtained under light microscope (Olympus® BX61 U-LH100-3). The light microscope analysis supported the even distribution of the clusters across the silicone matrix. Trained observers estimated that smaller clusters of 100-200 nm were also present in the matrix, though below formal level of detection. A top view picture was captured by scanning electron microscope (SEM; FBI Magellan™ 400 operated in tunneling mode) and at least 10 particles deemed by a trained operator to represent the majority of the CB population, such particles forming a representative set, were measured. The dimensions of isolated particles forming the clusters were found to be in agreement with PPS as provided by the manufacturer, and the cluster sizes was as preliminarily assessed under light microscope, confirming the presence of clusters as small as 100 nm. Without wishing to be bound by any particular theory, it is believed that amine groups of the amino-silicone dispersant bind to carboxy moieties of the carbon black, sufficiently enveloping the CB particles so as to reduce or prevent their agglomeration. Carbon black need not necessarily be functionalized with organic carboxylic acid, as oxygen absorbed on its surface behaves in a similar manner.

A mixture of vinyl functional polydimethyl siloxane (Polymer XP RV 5000, Evonik® Hanse, CAS No. 68083-18-1) containing a small amount of the same GP-342 dispersant (9:1 ratio by weight, respectively) was separately prepared with a high-shear homogenizer (T 50 digital Ultra-Turrax® equipped with R50 stirring shaft, IKA®-Werke GmbH) operated for about twenty minutes at a controlled temperature of 25° C. and at 10,000 rpm. It is believed that the presence of additional dispersant in the curable fluid prevents or reduces migration of this amine silicone polymer from the carbon particles to the vinyl functional PDMS, which diffusion, if overly extensive, could cause undesired agglomeration/aggregation/flocculation of the carbon black particles. The mixture comprising the vinyl functional PDMS was added to the black mass in an amount of about 375 g, so as to provide the remaining 37.5 wt. % of the composition. The addition was performed in step-wise fashion under continuous milling at the same conditions, until the black mass turned into a high-viscosity, shiny black paste (typically within 1 hour) having a high concentration of carbon black.

Dilution Step

In order to increase the fluidity of the black paste (25 wt. % CB) and facilitate spontaneous self-leveling after coating, the black silicone paste prepared as above-detailed was diluted to a concentration of 5 wt. % CB or less. Dilution was performed with a "Silicone premix" which was prepared as follows: a vinyl-terminated polydimethylsiloxane 5000 mm$^2$/s (DMS V35, Gelest®, CAS No. 68083-19-2) in an amount of about 50 wt. %, a vinyl functional polydimethyl siloxane containing both terminal and pendant vinyl groups (Polymer XP RV 5000, Evonik® Hanse, CAS No. 68083-18-1) in an amount of about 21.4 wt. %, and a branched structure vinyl functional polydimethyl siloxane (VQM Resin-146, Gelest®, CAS No. 68584-83-8) in an amount of about 28.6 wt. %, were mixed by the high-shear T 50 digital Ultra-Turrax® homogenizer operated at a controlled temperature of 25° C. and at 10,000 rpm for about twenty minutes.

The concentrated black paste was mixed with the silicone premix to reduce the CB concentration to 5 wt. % CB, as follows: GP-342 was added to the silicone premix so that their respective concentrations were 8 wt. % and 72 wt. % of the final diluted composition. The concentrated black paste was added so as to constitute 20 wt. % of the diluted composition, all these additions being performed under continuous stirring with a high-shear homogenizer (T 50 digital Ultra-Turrax®-IKA) at a controlled temperature of 25° C. and at 10,000 rpm. The stirring was maintained for approximately two hours until the diluted black PDMS silicone mixture was homogeneous (e.g., no black chunks or aggregates were observed). Different final concentrations of carbon black were similarly prepared by accordingly adjusting the quantities of the afore-mentioned stock fluids or pastes.

Curing Step

A diluted black PDMS silicone mixture as above-prepared can be rendered curable by the addition of: at least one catalyst, typically in an amount of about 0.0005 wt. % to 0.2 wt. %, or about 0.05 wt. % to about 0.2 wt. % of the total curable composition, at least one retardant or curing inhibitor to better control the curing conditions and progression, typically in an amount of about 0.1 wt. % to 10 wt. %, or from about 1 wt. % to 10 wt. % and finally, at least one reactive cross-linker, typically in an amount of about 0.5 wt. % to 15 wt. %, or from about 5 wt. % to 15 wt. %, the addition of the reactive cross-linker initiating the addition curing of the black PDMS mixture.

The above-described 5 wt. % CB diluted black PDMS silicone mixture was rendered curable by the addition of: a platinum catalyst, such as a platinum divinyltetramethyl-disiloxane complex (SIP 6831.2, Gelest®, CAS No. 68478-92-2) in an amount of about 0.1 wt. %, a retardant, such as Inhibitor 600 of Evonik® Hanse, in an amount of about 3.7 wt. %, and finally, a reactive cross-linker, such as a methyl-hydrosiloxane-dimethylsiloxane copolymer (HMS 301, Gelest®, CAS No. 68037-59-2) in an amount of about 8.7 wt. % of the total curable composition.

This addition-curable composition was shortly thereafter applied upon the desired mechanical support (e.g., upon a transparent or non-transparent body) with an automatic film applicator (Model: BGD281, Shanghai Jiuran Instrument Equipment Co., Ltd.) operated at 5-100 mm/s draw-down speed, the layers so applied forming predetermined thicknesses in the range of 5-200 micrometers.

As an example of a transparent body, a sheet of polyethylene terephthalate (PET, 100 & 150 micrometer thickness from Jolybar Ltd.) was used, such support being optionally pre-treated (e.g., by corona or with a priming substance) to further the adherence, to its support, of the material including the radiation absorbing layer. Corona treatment, when applied to the body, included an exposure of about 20 minutes to UV-irradiation (UltraViolet Ozone Cleaning System T10X10/OES/E, supplied by UVOCS® Inc.). A priming substance, when used to pre-treat the body, can comprise 2.5 wt. % tetra n-propyl silicate (CAS No. 682-01-9, Colcoat Co.), 2.5 wt. % vinyltrimethoxysilane (such as Dynasylan® VTMO, Evonik®), 5 wt. % titanium diisoproposy (bis-2,4-pentanedionate) (such as Tyzor AKT855, Gelest), 2.5 wt. % platinum-divinyl tetramethyl (CAS No. 68478-92-2, such as SIP 6831.2, Gelest®) all in pure methanol AR (CAS No. 67-56-1, Bio-Lab Ltd.). The priming substance can be applied by wiping the surface of the recipient layer/body with a clean laboratory fabric soaked with the priming fluid.

Transparent supports can be made of any optically clear suitable material (e.g., silicones such as polysiloxanes, polyethylenes, such as polyethylene terephthalate (PET) and polyethylene naphthalate (PEN), polyacrylates, such as poly (methylacrylate) (PMA) and poly(methyl methacrylate) (PMMA), polyurethanes (PU), polycarbonates (PC), polyvinyls, such as polyvinyl chloride (PVC), polyvinyl alcohol and polyvinyl acetate, polyesters, polystyrenes including acrylonitrile-butadiene-styrene copolymer, polyolefins (PO), fluoro-polymers, polyamides, polyimides, polysulfones or the like, copolymers thereof or blends thereof. A material is said to be optically clear if it allows light to pass through the material without being scattered (ideally 100% transmission). While transparency is generally assessed with respect to visible light, in the present context a material would be suitably transparent if having a transparency/transmission of at least 85%, at least 90% or at least 95% to the wavelengths of relevance to the emitting beams used in any particular system. Transparency can be assessed by measuring the optical transmittance of a predetermined thin sample of the material (e.g., a flat square having edges of 1 cm and a thickness of 0.2-2 mm, or more if desired for elements external to the transfer member) using a spectrophotometer, over the wavelength range of relevance. A refractive index (RI) of about 1.35 to 1.45 indicates an optically clear/transparent material. Each layer of a transparent transfer member through which radiation should progress should have similar or same RI values and/or transparency properties, so as to constitute a multi-layered transfer member having preferably even such characteristics across its thickness. Such properties are considered similar if within ±5%, or within ±2%, or even within ±0.5%.

The refractive index (RI) of materials is generally provided by the manufacturers, but can be independently assessed by methods known to the skilled person. For fluid materials (e.g., uncured/pre-cured silicones) methods such as described in ASTM D1218 may be suitable, while solid materials can be tested according to ASTM D542.

As explained, when using a transparent transfer member and rear-side irradiation, a compressible element external to the transfer member can be used instead of an internal compressible layer. In such case, the compressible element needs to be transparent at least to the same extent. Transparent supports, layers thereof, or external elements, preferably have a yellowness index of 1 or less.

The black polydimethyl siloxanes mixture, whether applied on a pre-treated body or on a non-pre-treated body, was cured for two hours at 70° C. in a ventilated oven (UT 12 P, Thermo Scientific Heraeus® Heating and Drying Ovens), followed by one hour post-curing at 120-140° C. to achieve a full cure and stable bonding of the layer to the support.

It is to be noted that the suitability of a hydrophobic amino-silicone polymer to disperse CB in size-reduced form in a silicone matrix is unexpected, in particular when the CB material is relatively hydrophilic. As a rule, dispersions of carbon black nanoparticles in silicones are difficult to achieve even when the particles and the silicone media have similar hydrophobicities. Such particles tend to agglomerate with one another, rather than remaining homogeneously dispersed in their primary particle size or any relatively small secondary particle size that would have been achieved by the dispersing step. To resolve this issue, conventional manufacturing methods aim to increase the relative polarity of the silicone media, using therefore condensation-curable silicone polymers and associated reagents, condensation curing being the mode of preparation of such CB-containing silicones.

In contrast, in the present example according to teachings of the invention, such dispersion of CB particles was achieved while using addition curing of the PDMS silicones and counter-intuitively using amino-silicones as a dispersant. The obtained environment, which is relatively non-polar, was expected to be "adverse" to relatively "size-stable" dispersions of CB. It should be additionally noted that the use of amino silicones is deemed counterintuitive because their amine moieties, when unbound and thus free to interact, are known to prevent or otherwise deleteriously affect addition-curing of the silicone matrix. Hence, the inventors have found a delicate balance concerning the amount of amino silicone present during the preparation of a CB-loaded silicone matrix. On the one hand, the amount should be enough to envelop the CB particles and prevent, reduce or delay their agglomeration/aggregation; on the other hand, an excess amount should be avoided to prevent, reduce or delay any deleterious effect on addition curing that such unbound amino silicones may have. A suitable concentration of amino silicones may depend on the type of CB particles and silicone media, as well as on the relative concentrations of the carbon black and curable silicone. This concentration may be determined by routine experimentation. In some embodiments, the weight-per-weight ratio between the carbon black and its dispersant (e.g., amino silicone, silicone acrylate etc.) is from 0.3:1 to 1:1, from 0.4:1 to 2:1, from 0.7:1 to 1.8:1, or from 0.9:1 to 1.6:1; and/or the carbon black to dispersant w/w ratio is approximately 0.3:1, 0.4:1, 0.5:1, 0.6:1, 0.7:1, 0.8:1, 0.9:1, 1:1 or 1:1.5, in other words the carbon black to dispersant w/w ratio can in some embodiments be in the range of 0.25:1 to 0.35:1, 0.35:1 to 0.45:1, 0.45:1 to 0.55:1, 0.55:1 to 0.65:1, 0.65:1 to 0.75:1, 0.75:1 to 0.85:1, 0.85:1 to 0.95:1, 0.95:1 to 1.05:1, or 1.05:1 to 1.15:1.

Without wishing to be bound to any particular theory, the attachment of the dispersant to the carbon black particles is believed to be non-covalent. In any event, even if the dispersant were to covalently bind to the carbon black particles to some extent, via chemical bonds between the molecules, the dispersant-laden particles of carbon black dispersed in a matrix as herein disclosed are not covalently bound to the silicone polymers or pre-polymers, in particular when addition-curing is being used. In other words, dispersant-laden carbon black particles prepared and/or dispersed according to the present teachings may be non-covalently, physically entrapped within the network of the cured silicone matrix. A person skilled in the preparation of elastomers may readily appreciate that the lack of covalent binding between particles and the surrounding polymer matrix may appreciably reduce the mechanical resistance of such elastomers as compared to a polymeric network comprising the same amount of particles covalently bound to polymers which may directly or indirectly (e.g., via coupling agents) chemically (covalently) attach the particles.

The skilled artisan will further appreciate that as the amount of carbon black is increased, the relative mechanical weakness, in absence of covalent bonds between CB particles and the silicone pre-polymers or polymers, worsens. The inventors unexpectedly found that despite the mechanical weakness induced by the presence of the non-covalently bound carbon black particles, the mechanical integrity of an imaging layer according to the present teachings may be sufficiently high for a transfer member prepared therewith to maintain structural integrity even at high concentrations of carbon black particles. Concentrations of up to 45 wt. %, up to 40 wt. %, up to 35 wt. % or up to 30 wt. % in a layer of silicone matrix may exhibit a mechanical integrity that is surprisingly suitable for layered articles comprising the same, and in particular for imaging layers of transfer members.

Amino silicones having a relatively low number of amine moieties (correlating with a low amine number) may be advantageous in achieving this balance. In some embodiments, the amino-silicone dispersant has an amine number within a range of 3 to 150, 4 to 130, 5 to 100, or 6 to 80.

In some embodiments, the amine number of the amino-silicone dispersant is at least 3, at least 4, at least 5, at least 6, at least 7, at least 8, at least 10, at least 12, at least 15, at least 20, or at least 25.

In some embodiments, the amine number of the amino-silicone dispersant is at most 150, at most 140, at most 130, at most 120, at most 110, at most 100, at most 90, at most 80, at most 70, at most 60, at most 50, at most 45, at most 40, at most 37, at most 35, at most 32, at most 30, at most 25, or at most 20.

While the amine number of amino-silicones is generally provided by the manufacturer of such materials, it can also be determined by routine analysis using standard methods. By way of non-limiting example, the amine number of a molecule harboring amine moieties can be assessed by titration of the amino-silicone with hydrochloric acid, the amine number corresponding to the milliliters of 0.1N HCl needed to neutralize 10 g of product.

Suitable amino-silicone dispersants can be selected from the group comprising aminoethyl-aminopropyl-methylsiloxane-dimethylsiloxane copolymers (CAS No. 71750-79-3), such as commercially available as GP-342 by Genesee, having a silicone backbone and CB-affinic amino moieties as branching units; LP X 21879 by BYK Additives & Instruments (showing an absorption band at 1446 cm$^{-1}$ in FTIR, correlating to amino groups); Silamine® 2972 and Silamine® STD-100 (by Siltech Corporation), easy release silicones, such as Tego® RC-902, premium release silicones, such as Tego® RC-922, siloxane acrylates, such as Tegomer® V-Si 2854 (all by Evonik®); aminopropyl terminated polydimethylsiloxane, such as DMS-A32, DMS-A35, and DMS-A32R (all by Gelest®); aminopropyl dimethyl-polysiloxane, such as KF-8015 (by Shin-Etsu Chemical Co); amine functional silicones, such as GP-4 and GP-581 (by Genesis Polymers Corporation), Mirasil® ADM 211 (by Elkem Silicones), Skycore® SR266 and Skycore® SR220 (by Skycent Chemicals); amino siloxanes, such as Struksilon F 571, Struksilon F 589 and Struktol VP 5421 (by Schill+Seilacher "Struktol"); and combinations thereof.

Mono-amines may be preferred, in particular when the amine moiety is terminally positioned. Without wishing to be bound by any particular theory, it is believed that once attached to carbon black, a terminal mono-amine is hindered and thus unavailable to negatively affect curing.

The surprising efficacy of the amino silicone was further corroborated with the preparation of a first comparative formulation similar to the above, in which the amino silicone was replaced by a dispersant of a different chemical family known for its expected suitability with CB: a polyglycerin-modified silicone KF-6106, supplied by Shin-Etsu Chemical Co. This conventional surfactant failed to satisfactorily disperse the CB particles of the present formulation.

In a second comparative example, a commercially available concentrated CB paste (Akrosperse 20-MI-005, 50% wt CB, Akrochem Corporation) was mixed with the same ACS PDMS (DMS V35) in respective amounts yielding a 5 wt. % final CB concentration. The CB paste was used as supplied, without addition of any dispersant of any type. The mixture was dispersed using the spinning tree-roll mill similarly operated. Following this control process, the CB displayed relatively large aggregates (~0.5-1.5 µm, as microscopically assessed), which were at least two-fold larger than the secondary particles formed using the present formulation and method.

Following the same rationale concerning the prevention of carbon black self-agglomeration/self-aggregation (through formation of a dispersant's envelop), it was found that in addition to amine functions of amino silicones, acrylate functions of silicone acrylates can achieve similar CB dispersion. Exemplary silicone acrylates were formulated in a PDMS matrix as above-detailed, with minor modifications, such as the amount of the carbon black being of only 3 wt. % instead of previously described 5 wt. %. KP-578 supplied by Shin-Etsu Chemical Co., Tego® RC 711 (~1% acrylate) and Tego® RC 902 (~4% acrylate), supplied by Evonik® Industries, achieved satisfactory CB dispersion at the tested CB concentration.

In the case of silicone acrylates, an acrylate content of at least 0.5 wt. % in the silicone dispersant is believed to be satisfactory, higher contents of more than 5 wt. % being deemed preferable. It is believed that higher amount of an active moiety of a dispersant on any given backbone may allow reducing the amount of dispersant necessary for the dispersion of same amount of CB particles. The content of acrylate in the silicone dispersants is typically provided by their suppliers, but can be determined by standard measuring procedures.

The skilled person can readily appreciate that in the above-described exemplary formulations including carbon black particles dispersed in PDMS silicone matrices with various amino silicones and silicone acrylates dispersants, the dispersant-laden carbon black particles are not covalently bound to the matrix. Unbound carbon black particles may leach out from a cured material swelled in a swelling solvent (e.g., toluene) if exposed for sufficient time and temperature (e.g., 12 hrs at 60° C.) to allow release of the particles from physical entrapment.

Second Exemplary Procedure

While the afore-mentioned method of preparing a radiation absorbing layer or an imaging layer including the same, such layers able to later form an imaging surface, was substantially devoid of added volatile organic solvents, the following alternative procedure makes use of such liquids. Such solvents, when compatible with the intended silicone fluid, may facilitate some stages of the layer preparation or application to recipient layers or supports, a relatively high volatility being advantageous in reducing or eliminating the presence of these solvents in a final transfer member. A solvent is deemed sufficiently volatile if having a sufficiently low vapor pressure or partial vapor pressure so as to substantially evaporate during curing.

In the present example, 50 g of CB (Colour Black FW 182, Orion Engineered Carbons) having a Dv10 of about 2.9 µm, a Dv50 of about 4.5 µm, and a Dv90 of about 6.1 µm, as measured by DLS (Malvern Zetasizer Nano S) were mixed with 50 g of amino silicone dispersant (BYK LP X 21879, having an amine number of about 35, BYK Additives & Instruments) in 200 g of xylene AR (having a boiling point of about 138.4° C., CAS No. 1330-20-7, Bio-Lab Ltd.). As in previous example, the CB powder was dried for at least two hours at 120° C. before being mixed with the silicone dispersant. The dispersion was carried out in an attritor bead mill (Attritor HD-01, Union Process®) with stainless steel beads of about 4.76 mm (SS 302 3/16 inch beads, Glen Mills Inc.) at 700 rpm until the CB particles reached an average SPS (e.g., as assessed by D50) of less than 100 nm, generally of about 70 nm, which typically required about 1.5-2.5 hours, depending on the batch size. The size reduction was performed under controlled temperature of 50° C. The size distribution was then assessed by DLS (Malvern Zetasizer Nano S) on a sample comprising about 0.1 wt. % of CB and the CB particles co-milled with the dispersant were found to be predominantly in the nano-range (having a Dv10 of about 48 nm, a Dv50 of about 74 nm, and a Dv90 of about 139 nm).

The CB dispersion was added to a two-part LSR silicone fluid, the relative amount of the added dispersion depending on the desired final amount of CB in the matrix. In the present set of experiments, the CB concentrations per weight of the final matrix (i.e. excluding the volatile solvent) were about 2.4 wt. %, 4.5 wt. %, 6.5 wt. %, 8.3 wt. %, 11.5 wt. % and 14.3 wt. %. The according weight of CB dispersions (i.e. about 6 g, 12 g and so on) was added to 20 g of Silopren® LSR 2540 (Part A), gently hand mixed, then poured into 20 g of Silopren® LSR 2540 (Part B), by Momentive Performance Materials Inc. It is noted that adding the CB materials to a pre-mix of Part A and Part B of the LSR was also found to be satisfactory. The resulting CB silicone fluid was further mixed for about three minutes in a planetary centrifugal mixer (Thinky ARE-250, Thinky Corporation) operated at 2,000 rpm at ambient temperature and allowed to defoam under sole same centrifugal conditions for another three minutes. A sample was cured at 140° C. for about 2 hours. The pattern of dispersion of the CB particles in the silicone matrix was assessed by light microscopy as previously detailed and found stable over the curing period of the LSR components.

To facilitate the application of the afore-mentioned CB dispersed LSR silicone fluid, the stock was diluted in excess volatile solvent, xylene in the present case, typically at a weight per weight ratio of at least 1:4, for instance at 1:9 wt./wt. The CB particles in the diluted silicone matrix appeared to remain stably dispersed for a period of time corresponding at least to duration of casting, as assessed by light microscopy.

The diluted CB—LSR—xylene suspension was applied to a smooth releasable support (e.g., non-treated PET sheet) by spray coating using an air pressure brush. Alternative application methods are possible (e.g., rod coating and the like). While partial curing of the silicone matrix may proceed at relatively low temperature of 100-120° C. (taking at most 2 hours, but generally about 0.5-1 hour, depending on layer thickness), such step can be accelerated by raising the temperature (e.g., reducing curing duration to about 20 minutes if cured at 140° C.). A clear silicone layer (due to serve as a conformational layer) was then cast on top of such a partially cured radiation absorbing layer/imaging layer. One such silicone overcoat was a two-component clear liquid silicone, QSil 213, commercially available from Quantum Silicones. The resulting PET-supported layers were further partially cured at about 100° C. for approximately 1-2 hours. The PET support was then peeled away and the two layers inverted so as to have the CB-loaded radiation absorbing layer facing up and the clear conformational layer facing down, the latter layer being then attached to the desired support (e.g., a transparent support) by any suitable method. In some embodiments, the attachment of such layers to the support contributed to the completion of the curing of the imaging surface.

This alternative procedure allows the preparation of a silicone matrix having a relatively high load of carbon black particles, such particles having the advantage, as in the previously described method, of being in the sub-micron range and even predominantly in the nano-range.

Third Exemplary Procedure

While the afore-mentioned methods of preparing a radiation absorbing layer, or an imaging layer including the same, were based on addition-curing of cross-linkable addition curable silicones, the present procedure alternatively involves condensation-curing of cross-linkable condensation-curable silicones.

In a first step, the CB material was dried (at least two hours at 120° C.), then size reduced in presence of a silicone dispersant. In the present example, 50 g of CB (Colour Black FW 182) were mixed with 50 g of amino silicone dispersant (BYK LP X 21879) in 100 g of hexamethyl-disiloxane (HMDSO; having a boiling point of about 101° C., CAS No. 107-46-0, Sigma-Aldrich Co. Ltd.). HMDSO was used as a volatile liquid diluent, in a manner similar to xylene in previous example. The dispersion was carried out for 4 hours in an attritor bead mill with stainless steel beads of about 4.76 mm (as previously described) at 700 rpm until the CB particles reached an average SPS (e.g., as assessed by D50) of about 90 nm, as assessed by DLS. The size reduction was performed under controlled temperature of 25° C.

The size distribution was then assessed by DLS (Malvern Zetasizer Nano S) on a sample comprising about 0.1 wt. % of CB and the CB particles co-milled with the dispersant were found to be in the sub-micron to nano-range (having a Dv10 of about 52 nm, a Dv50 of about 91 nm, and a Dv90 of about 211 nm).

In a second step, the CB dispersion was added to a silanol-terminated polydimethyl-siloxane, the relative amounts of the added dispersion depending on the desired final amount of CB in the matrix. In the present set of experiments, the CB concentrations per weight of the final matrix were about 5.5 wt. %, 12.5 wt. % and 21.4 wt. %. The according weight of CB dispersions (i.e. 40 g, 80 g and 120 g) was added to silanol-terminated PDMS (DMS S-27, 700-800 mm$^2$/s, Gelest®) in respective amounts of 160 g, 120 g and 80 gr. The resulting CB silicone fluid was mixed for about ninety minutes in the attritor under the same conditions (700 rpm and 25° C.) resulting in a black mass of condensation-curable PDMS.

To 9 g of CB-dispersed in the curable silicone, were added 1 g of cross-linker (ethylpolysilicate PSI023, Gelest® or ethylsilicate 48, Colcoat) and 0.05 g of tin catalyst (dioctyl tin bis(acetylacetonate) Tin Kat® 223, CAS No. 54068-28-9, TIB). The curable mixture was degassed and applied to a desired support. Prior to the application of the degassed mixture, a transparent PET was pretreated with ozone and coated with a priming layer (SS4120, Momentive) to facilitate attachment. The condensation-curable silicone layer was applied by a rod wire at predetermined thicknesses of up to about 40 μm (including layers of 5 μm and 20 μm) and allowed to partially cure at ambient conditions (circa 23° C. and 30-60% RH) for about 12-24 hrs. The partly cured structure was transferred to an oven for 2 hrs at 120-140° C. and about 30% RH, for curing finalization. The pattern of dispersion of the CB particles in the condensation-cured silicone matrix was assessed by light microscopy as previously detailed and found stable, the particles being well-dispersed and without particles flocking.

While silicones comprising CB are commercially available, attempts to size reduce their CB contents to such desired particle size ranges have so far proven difficult. In a comparative example, a commercially available concentrated CB paste wherein CB is pre-dispersed in a silicone fluid (Akrosperse 20-MI-005, 50% wt CB, Akrochem Corporation) was mixed with the same CCS PDMS (DMS S-27) in respective amounts yielding a 5 wt. % final CB concentration. The CB paste was used as supplied, without addition of any dispersant of any type. The mixture was dispersed using the spinning tree-roll mill operated as described in the first experimental procedure. Following this control process, the CB displayed relatively large aggregates (~0.5-1.5 μm, as microscopically assessed), which were, as previously observed with the ACS control, at least two-fold larger than the secondary particles formed using the present formulation and method.

Without wishing to be bound by any particular theory, it is believed that the conventional formulations lack CB particles having suitable properties, and/or appropriate amounts and/or suitable agents able to prevent the reagglomeration of primary particles that may be transiently obtained during any such milling.

Optical Measurements

Some optical properties of the radiation absorbing layers or imaging surfaces prepared by the above-described methods were assessed. Unless otherwise stated, the sample of interest was cast on a smooth support, such as a glass slide, and leveled by rod coating to a known thickness and cured (e.g., 1-2 hrs at 120-140° C.), the cured layer having generally a thickness of at least 2 μm, as established by confocal microscopy.

The cured layer was gently separated from its casting support and placed in a film holder suitable for subsequent measurements. The optical absorbance of such samples was measured with a spectrophotometer over a range of at least 300 nm to 1200 nm (Cary 5000, UV-Vis-NIR spectrophotometer from Agilent Technologies). The drop in intensity between the two sides of the film was normalized to the thickness of the tested samples and the absorbance of such layers per micrometer of thickness (Abs/μm) was calculated.

Representative results of normalized absorbance at selected wavelengths, for layers including CB particles dispersed with amino silicone dispersants, are presented in the table provided below in which the values reported for the matrices loaded with carbon black relate to the effect of the sole CB particles (the baseline values of the respective matrices being subtracted).

TABLE 1

| No. | Sample | Abs/m @ 300 nm | Abs/m @ 500 nm | Abs/m @ 700 nm | Abs/m @ 900 nm | Abs/m @ 1100 nm |
|---|---|---|---|---|---|---|
| 1 | 2.5 wt. % CB in PDMS | 0.293 | 0.093 | 0.069 | 0.056 | 0.048 |
| 2 | 5.0 wt. % CB in PDMS | 0.479 | 0.188 | 0.138 | 0.109 | 0.091 |
| 3 | 7.5 wt. % CB in PDMS | 0.692 | 0.291 | 0.204 | 0.158 | 0.129 |
| 4 | Control: 10 wt. % CCB in PDMS | 0.290 | 0.102 | 0.090 | 0.087 | 0.085 |
| 5 | Ref: 0 wt. % CB in LSR | 0.00103 | 0.00149 | 0.00137 | 0.00150 | 0.000135 |
| 6 | 2.4 wt. % CB in LSR | 0.067 | 0.041 | 0.029 | 0.021 | 0.018 |
| 7 | 4.5 wt. % CB in LSR | 0.196 | 0.106 | 0.074 | 0.056 | 0.047 |
| 8 | 6.5 wt. % CB in LSR | 0.439 | 0.224 | 0.156 | 0.117 | 0.096 |
| 9 | 8.3 wt. % CB in LSR | 0.651 | 0.326 | 0.222 | 0.165 | 0.133 |
| 10 | 11.5 wt. % CB in LSR | 0.681 | 0.379 | 0.261 | 0.195 | 0.159 |
| 11 | 14.3 wt. % CB in LSR | 0.733 | 0.413 | 0.285 | 0.214 | 0.172 |
| 12 | 5.5 wt. % CB in S27 | 0.549 | 0.226 | 0.167 | 0.135 | 0.114 |
| 13 | 12.5 wt. % CB in S27 | 0.577 | 0.271 | 0.214 | 0.172 | 0.147 |

As can be seen in the above table, CB particles dispersed according to the various methods herein disclosed provided comparable absorbing properties per micrometer depth of layer, such absorbance generally decreasing as the wavelengths increased. In the above, the methods of preparation and resulting layers were exemplified with three types of silicone polymers, two types of curing method and two types of amino silicones, see items 1-3 for addition curing of ACS PDMS, items 6-11 for addition curing of ACS LSR and items 12-13 for condensation curing of CCS PDMS. These examples also represent different types of interactions between the silicone dispersants and the CB particles Amino silicone dispersants are expected to form acid-base relationship or amine-epoxy interactions. Silicone acrylate dispersants are believed to form dipole:dipole interactions.

All items representing exemplary embodiments of silicone matrix embedded dispersions of CB particles prepared according to the present teachings, formed clear samples (i.e., lacking haziness/turbidity), as assessed by visual inspection. Such results support the compatibility of the silicone dispersants with the curable silicone elastomers, including their miscibility therein. Such compatibility can also be preliminarily assessed in a screening method of such materials, performed in the absence of carbon black particles.

For comparison, similar silicone matrices prepared in absence of CB particles according to the present teachings displayed an insignificant to null baseline absorbance, of about 0.001 Abs/μm or less, over the same range of wavelengths, see item 5 for LSR matrix, the PDMS matrices behaving similarly whether cured by addition-curing or by condensation-curing. The impact of the CB nanoparticles dispersed according to present teachings can be seen from the positive correlation between the wt. concentration of CB in the silicone matrix and the absorbing capacity of the layer over the tested range. Based on the present set of results peak or plateau of absorbance for each particular formulation are expected at carbon loading of at least 10 wt. %, at least 15 wt. % or possibly at carbon loading of more than 20 wt. %. Such CB concentration dependent patterns can readily be established by the skilled person, whom can elect desired CB loading as per peak of optimal activity and/or intended use. For all practical purposes, it is believed that carbon black presence in curable or cured silicone compositions needs not to exceed 30 wt. %, being often of no more than 25 wt. %.

Reverting to the table, in a control experiment, see item 4, a comparative layer was prepared in which the same carbon black material was milled and incorporated in a PDMS matrix similarly to items 1-3, the method however lacking any amino silicone dispersant. In the resulting layer, the CB particles were therefore of a more conventional size, in the range of 0.5-1.5 μm. This conventional CB (CCB) material was embedded in the PDMS matrix at a relatively high concentration of 10 wt. %. Despite such high load, the CCB control provided a poorer absorption relatively to lower concentrations of CB particles prepared according to some embodiments of the invention. In this experiment, the 10 wt. % CCB in PDMS was found comparable to the 2.5 wt. % CB in PDMS, see items 4 and 1, respectively. Therefore, the present methods and formulations are approximately 4-fold superior, with respect to the amount of CB particles providing similar absorbance. The ability to reduce the amount of CB to achieve a particular radiation absorbance can have numerous beneficial implications, beyond cost reduction, as readily appreciated by the skilled person.

Methods of Manufacturing Transfer Members

Methods of manufacturing transfer members for indirect printing are known. When the transfer member comprises two layers or more, such layers, in particular if made of elastomers, can be deposited one on another, a carrier optionally serving as support for the preparation of the first layer serving for further deposition and preparation of a multi-layer article. A curable composition may be deposited on a substrate or on an adjacent layer by any suitable process, such as pouring, casting, web-coating, roll-coating, draw-down coating, spray coating, spin coating, spraying, molding, laminating, and the like.

When the transfer member is to be a plate or a strip, then the sequential deposition or attachment of layers can be done on a flat planar surface. Considering a transfer member having a support layer and an imaging layer, it is generally manufactured "bottom-up"—the release surface being the last to be formed, as described for instance in WO2013/132432. The Applicant discloses an alternative method in co-pending application PCT/IB2017/053181, filed on May 30, 2017. Briefly, articles such as the present transfer members can be manufactured "top-to-bottom"—in which case the release surface is the first to be formed, in an inverted orientation as compared to more conventional methods. A strip of transfer member prepared by such methods can be releasably or permanently attached by its ends to form a continuous looped belt, such attachment (which can be achieved by any securing method selected from the group comprising fastening, soldering, welding, adhering, taping and the like), forms a seam. While some printing systems can operate even when a seam is present on the transfer member, other are more sensitive to such discontinuity in the release surface. If such devices cannot be adjusted to skip the area of the seam, then continuous seamless transfer members are preferred.

A seamless transfer member can be prepared, for instance, by centrifugal casting. Briefly, the curable compositions due to form the layers of the transfer member are deposited (e.g., sprayed or poured) upon the walls of a revolving cylindrical mold. To facilitate coating and/or to provide for thin layers, the curable compositions are typically applied in a diluted form, the diluent being generally a volatile organic solvent. The amount to be sprayed is calculated based on the extent of dilution and the intended thickness and concentration of non-volatile constituents in the desired layer. The extent of dilution may depend on the desired viscosity, which in turn can be affected by the mean of deposition. When using a spraying applicator, the viscosity can depend, for instance, on the size of the nozzles. Manufacturer of spray guns generally provide the range of viscosity that can be sprayed using their product (e.g., up to 200 mPa·S).

Generally, the diluted curable composition is degassed before being applied. The spinning mold can be heated to a temperature high enough to facilitate the evaporation of the volatile diluent, but sufficiently low so as to delay curing until a desired thickness of at least partially evaporated curable composition has uniformly build-up on the spinning walls of the mold. When the first layer has reached its desired wet thickness, its partial curing can be accelerated, for instance by increasing the temperature. Heating can be done by way of internal heating elements (providing radiant heat) within the plenum of the spinning mold, or by way of heating elements external to the mold. In order to enhance the adhesion between layers being spin casted by such a method, the subsequent layer is deposited on a previous layer, when the latter is not yet fully cured.

The rotation speed can be dependent on the method and rate of curable composition deposition and designed to ensure uniform coverage of the mold internal surface by the spray or any other mean of application of the composition. The linear velocity of the circumference depends on the diameter of the mold which can be driven to rotate at up to 600 rpm. Generally, when the solvent diluted curable composition is first deposited, the mold is rotated relatively slowly and the coating of the inner walls is initially performed at ambient temperature until a uniform film covering the entire surface of the walls is obtained. Then the rotation speed can be increased and the temperature can be raised, for instance to 60° C.-100° C. for partial curing of addition-curable compositions, for about 30 to 60 minutes.

This process can be repeated according to the number of cured layers that are desired for the transfer member. The mode of application of each layer may differ. For instance, while for the casting of thin layers, spray coating of relatively diluted and non-viscous curable liquids can be preferred, for thicker layers traditional application by pouring of undiluted/relatively more viscous curable compositions can alternatively be used.

Generally, the multilayer sleeve is extracted from the mold as soon as the layers have sufficiently attached one to another and have enough structural integrity. At this stage, the layers may be only partially cured, facilitating the separation of the release surface from the inner walls of the mold. The resulting seamless belt is transferred to a ventilated oven for final curing at an elevated temperature compatible with the layers composition (e.g., at 120-150° C. for 0.5-2 hours for addition-curable compositions). The skilled person can readily select the conditions appropriate to any particular composition/layer. For instance, casting of condensation-curable layers is performed under relatively high % RH when curing is to be triggered or accelerated, as compared to addition-curing which, on the contrary, can be delayed by humidity.

Adapting Transfer Members for use in Printing Systems

Unless the transfer members are directly prepared (e.g., on a rigid support) so as to be ready for use in a printing system, they can be further adapted to serve their intended use. Methods of adapting transfer members manufactured, by way of non-limiting example, as previously described are known and can readily be implemented by the skilled person. Taking for instance flexible transfer members, a segment of desired dimensions can be isolated from the multi-layered strip and be attached to an appropriate support (e.g., a platen or a drum). Alternatively, and additionally, the two ends of such a strip can be secured to one another to form a continuous loop. Furthermore, WO2013/136220 teaches how formations projecting laterally from the strip may enable lateral tensioning and/or guiding of a transfer member along a printing path formed by the various stations of a printing system. Such stations, which need not be detailed herein, may include, depending on the printing process, an imaging station, where ink is deposited or transformed on the release surface to yield an ink image, a drying station (e.g., to evaporate carrier of liquid inks), a curing station (e.g., to cure curable constituents of the ink) and an impression or transfer station, where the ink image is transferred from the release surface to a printing substrate. A printing system may include tracks or guiding channels along the entire path to be followed by the transfer member during operation, or along particular segments of the path (e.g., only at or in the vicinity of a particular printing station).

Therefore, for printing systems wherein the transport system of the transfer member includes two lateral tracks, extending one on each side of the transfer member, the transfer member of the invention advantageously includes lateral formations that can be slidably retained by tracks of suitable cross-section. For example, lateral formations having an approximate circular cross-section may be retained by tracks having a C-shaped cross-section.

The lateral formations can be attached to the desired strip segment or can be formed concomitantly with the manufacturing of the transfer member. The lateral formations on a side of the transfer member can be a plurality of formations that are spaced from one another along the length of the strip. Such spaced formations may conveniently be the teeth of one half of a zip fastener. The laterally projecting formations need not be evenly spaced and in an embodiment of the invention a predetermined irregular spacing may serve to control parameters associated with the use of the transfer member in a printing system.

In an alternative embodiment, the formations may comprise two flexible rails having bead-like cross-section, arranged one on each side of the transfer member, the beads typically having a diameter larger than the thickness of the member. In this arrangement, the bead is considered to provide a continuous formation on each side of the strip. While the projecting lateral formations on opposite sides of the strip were described as being identical with one another, this needs not be necessarily the case. The differences between formations on each side can relate to any of the type of formations, their spacing, their dimensions, their chemical compositions and/or their physical properties. In one embodiment, the formation(s) on one side, or their attachment to the transfer member, may provide a different extensibility/elasticity than the formation(s) on the opposite side.

Typically, the formations are made of a material having a low friction coefficient to ensure smooth running of the formations within the lateral tracks. Moreover, the formations can be made of a material, or can comprise an agent, or can be coated with a coating having lubricating properties.

The transfer members according to the present teachings may further include one or more markings detectable by a sensor of a printing system, such sensors being generally mounted at different positions along the length of the printing path followed by the transfer member. Such markings are generally positioned near the edges of the transfer member, out of the area of the release surface that may be used for ink deposition or transformation. The output signals of such optional elements may assist indicating the relative position of the transfer member with respect to any printing station of interest. For example, such markings and corresponding detectors may be used to monitor the position of a seam, if present. Analysis of the output signals of the markings can also be used to control the speed of the transfer member.

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb.

As used herein, the singular form "a", "an" and "the" include plural references and mean "at least one" or "one or more" unless the context clearly dictates otherwise.

Positional or motional terms such as "upper", "lower", "right", "left", "bottom", "below", "lowered", "low", "top", "above", "elevated", "high", "vertical", "horizontal", "front", "back", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" precedes a numerical value, it is intended to indicate +/−15%, or +/−10%, or even only +/−5%, and in some instances the precise value.

While this disclosure has been described in terms of certain embodiments and generally associated methods, alterations and permutations of the embodiments and methods will be apparent to those skilled in the art. The present disclosure is to be understood as not limited by the specific embodiments described herein.

The invention claimed is:

1. A transfer member for receiving ink and transferring an ink image to a substrate, the transfer member comprising:
   a) a support layer; and
   b) an imaging layer, disposed on the support layer, the imaging layer comprising:
      i) a cured hydrophobic silicone matrix comprising hydrophilic carbon black particles non-covalently dispersed therein and one of platinum and tin; and
      ii) a release surface distal to the support layer.

2. The transfer member according to claim 1, wherein the release surface is integral to the imaging layer.

3. The transfer member according to claim 1, wherein the hydrophobic silicone matrix is addition-cured and contains platinum, the platinum being derived from a platinum catalyst.

4. The transfer member according to claim 3, wherein the hydrophobic silicone matrix of the imaging layer is a layer formed from silicone pre-polymers selected from liquid silicone resins (LSR), addition-curable room temperature vulcanization (RTV) silicones, addition-curable polydialkyl siloxanes (PDAS) silicones, addition-curable polydimethyl siloxanes (PDMS) silicones and functionalised versions thereof, provided that the silicone pre-polymer is not a fluorosilicone.

5. The transfer member according to claim 1, wherein the hydrophobic silicone matrix is condensation-cured and contains tin, the tin being derived from a tin catalyst.

6. The transfer member according to claim 5, wherein the hydrophobic silicone matrix of the imaging layer is a layer formed from silicone pre-polymers selected from condensation-curable RTV, PDAS, PDMS silicones and functionalised versions thereof, provided that the silicone pre-polymer is not a fluorosilicone.

7. The transfer member according to claim 1, wherein the silicone matrix further comprises a dispersant having at least one carbon-black-affinic moiety, wherein the dispersant satisfies at least one of:
   a) having a branched molecule structure, having a backbone and at least one branching unit, and the at least one carbon-black-affinic moiety is disposed within any one of the following:
      i. the at least one branching unit, the backbone of the dispersant being a siloxane-based backbone; and
      ii. the backbone, at least a portion of said branching units of said dispersant being siloxane-containing branching units; and
   b) being selected from the group consisting of: an amino-silicone dispersant, an epoxy-silicone dispersant and a silicone-acrylate dispersant.

8. The transfer member according to claim 1, wherein the transfer member or the support layer is substantially transparent.

9. The transfer member according to claim 1, wherein the support layer is substantially transparent.

10. The transfer member according to claim 1, wherein the release surface is hydrophobic.

11. The transfer member according to claim 1, wherein the release surface is hydrophilic.

12. The transfer member according to claim 1, wherein the imaging layer has a thickness of 25 µm or less, 20 µm or less, 15 µm or less, 10 µm or less, 5 µm or less, 2 µm or less, or 1 µm or less.

13. The transfer member according to claim 1, wherein the imaging layer has a hardness between 1 Shore A and 80 Shore A.

14. The transfer member according to claim 1, wherein the support layer is flexible.

15. The transfer member according to claim 14, further comprising, along lateral edges of the transfer member, protruding formations which are capable of engaging with lateral tracks in a printing system so as to (a) constrain the transfer member to follow a printing path in at least a segment of the path and/or to (b) place the transfer member under lateral tension, in at least a segment of the path;
   wherein the formations on at least one of the lateral edges are (i) a plurality of formations that are spaced from one another along the length of the transfer member, or (ii) a continuous formation along the entire length of the lateral edge, the formations optionally having a thickness greater than the transfer member.

16. The transfer member according to claim 15, wherein the formations are (I) made of a material having a low friction coefficient to ensure smooth running of the formations and/or (II) made of a material, or comprise an agent, or are coated with a coating having lubricating properties.

17. The transfer member according to claim 1, wherein the support layer is rigid.

18. The transfer member according to claim 1, further comprising one or more layers selected from the list comprising: a conformable layer, a compressible layer, an adhesive layer and a friction layer.

19. The transfer member according to claim 1, wherein the transfer member is a seamless transfer member.

20. A method for preparing a transfer member, the transfer member comprising on a first side a release surface for receiving ink and transferring an ink image to a substrate, the method comprising:
   a) providing a support layer adapted to form a rear side of the transfer member, the rear side being opposite the first side;
   b) providing an imaging layer, the imaging layer including a hydrophobic silicone matrix comprising hydrophilic carbon black particles non-covalently dispersed therein;
   c) optionally providing a release layer able to form the release surface;
   d) contacting the support layer, the imaging layer and the optional release layer, when at least one of any two adjacent said layers is at least partially cured; and
   e) fully curing the transfer member including said layers so that the surface distal to the support layer forms the release surface, said surface being part of the imaging layer or of the release layer;
   wherein the hydrophilic carbon black particles have one or more properties selected from the list consisting of:
   i. an oxygen content on the surface of the carbon atoms between 1.0 wt. % and 40 wt. %, 2 wt. % and 35 wt. %, 3 wt. % and 35 wt. %, 4 wt. % and 30 wt. %, 4 wt. % and 25 wt. %, 5 wt. % and 25 wt. %, 5 wt. % and 20 wt. %, 6 wt. % and 20 wt. %, 6 wt. % and 18 wt. %, 7 wt. % and 15 wt. %, 8 wt. % and 13 wt. %, or 10 wt. % and 13 wt. %, by weight of the carbon black particles;
   ii. a volatile components content between 1.5 wt. % and 50 wt. %, 2.5 wt. % and 50 wt. %, 3.5 wt. % and 40 wt. %, 5 wt. % and 40 wt. %, 5 wt. % and 30 wt. %, 5 wt. % and 25 wt. %, 7 wt. % and 30 wt. %, 10 wt. % and 30 wt. %, 10 wt. % and 25 wt. %, or 15 wt. % and 22 wt. %, by weight of the carbon black particles;
   iii. a surface zeta potential between −70 mV and −15 mV, −70 mV and −20 mV, −70 mV and −25 mV, −70 mV and −30 mV, −70 mV and −35 mV, −70 mV and −40 mV, −70 MV and −45 mV, −60 mV and −20 mV, −60 mV and −30 mV, −60 mV and −35 mV, −55 mV and −30 mV, −50 mV and −25 mV, −50 mV and −30 mV, or between −50 mV and −35 mV, as measured at a pH of at least 8.0;

iv. a pH between 2.0 and pH 8.5, 2.5 and 7.5, 2.0 and 5.5, 2.0 and 4.5, 2.5 and 4.0, or between 2.0 and 3.5, when measured for an aqueous dispersion of said hydrophilic carbon black particles;

v. a dibutyl phthalate (DBP) absorption value between 50 mL/100 g and 200 mL/100 g, 100 mL/100 g and 200 mL/100 g, or between 150 mL/100 g and 200 mL/100 g; and vi. a specific surface area between 50 $m^2/g$ and 650 $m^2/g$, or between 100 $m^2/g$ and 550 $m^2/g$, as determined by BET nitrogen absorption.

\* \* \* \* \*